(12) United States Patent
Stoller et al.

(10) Patent No.: US 12,495,729 B2
(45) Date of Patent: Dec. 16, 2025

(54) TARGETED FLUID/SOLID DISPENSING BASED ON SENSED SEED DATA OR SENSED PLANT DATA

(71) Applicant: Precision Planting LLC, Tremont, IL (US)

(72) Inventors: Jason Stoller, Eureka, IL (US); Ben L. Schlipf, Tremont, IL (US); Justin McMenamy, Edwards, IL (US)

(73) Assignee: Precision Planting LLC, Tremont, IL (US)

( * ) Notice: Subject to any disclaimer, the term of this patent is extended or adjusted under 35 U.S.C. 154(b) by 36 days.

(21) Appl. No.: 18/522,715

(22) Filed: Nov. 29, 2023

(65) Prior Publication Data

US 2024/0094181 A1   Mar. 21, 2024

Related U.S. Application Data

(62) Division of application No. 16/642,327, filed as application No. PCT/US2018/049540 on Sep. 5, 2018, now Pat. No. 11,864,487.

(60) Provisional application No. 62/554,448, filed on Sep. 5, 2017, provisional application No. 62/567,715, filed on Oct. 3, 2017.

(51) Int. Cl.
| | |
|---|---|
| *A01C 7/06* | (2006.01) |
| *A01C 7/10* | (2006.01) |
| *A01C 23/00* | (2006.01) |
| *A01C 23/02* | (2006.01) |

(52) U.S. Cl.
CPC .............. *A01C 7/06* (2013.01); *A01C 7/105* (2013.01); *A01C 23/007* (2013.01); *A01C 23/02* (2013.01); *A01C 23/023* (2013.01)

(58) Field of Classification Search
CPC ......... A01C 7/06; A01C 21/00; A01C 23/023; A01C 7/105; A01C 23/007; A01C 23/02
See application file for complete search history.

(56) References Cited

U.S. PATENT DOCUMENTS

| | | | | |
|---|---|---|---|---|
| 1,993,649 | A * | 3/1935 | Crutcher | A01C 7/06 111/900 |
| 4,603,645 | A * | 8/1986 | Wiemeyer | A01C 7/16 111/194 |
| 5,890,445 | A * | 4/1999 | Ridgley | A01C 23/024 239/149 |
| 6,208,255 | B1 * | 3/2001 | Conrad | A01C 7/105 340/684 |
| 6,346,888 | B1 * | 2/2002 | Conrad | A01C 7/105 340/684 |

(Continued)

FOREIGN PATENT DOCUMENTS

CA   2947880 C * 9/2017

*Primary Examiner* — Jamie L McGowan

(57) ABSTRACT

A planter system includes seed sensors for determining seed placement in a furrow to then target at least one of fluid and solid application with respect to the seed. A material application system dispenses a fluid or solid material with one or more dispensing devices containing at least a first material dispensing location to dispense material into a seed furrow and a second material dispensing location to dispense material into the seed furrow or into a furrow that is laterally adjacent to the seed furrow. Plant sensors determine locations of plants within a field and then target at least one of fluid and solid application with respect to the plant.

6 Claims, 33 Drawing Sheets

(56) References Cited

U.S. PATENT DOCUMENTS

| | | | |
|---|---|---|---|
| 6,516,733 B1* | 2/2003 | Sauder | A01C 21/005 111/180 |
| 6,681,706 B2* | 1/2004 | Sauder | A01C 7/20 111/900 |
| 6,918,342 B2* | 7/2005 | Sauder | A01C 5/068 111/189 |
| 7,270,065 B2* | 9/2007 | Conrad | A01C 7/06 111/900 |
| 7,370,589 B2* | 5/2008 | Wilkerson | A01C 7/105 222/14 |
| 7,497,174 B2* | 3/2009 | Sauder | A01C 7/06 111/163 |
| 7,918,168 B2* | 4/2011 | Garner | A01C 7/042 111/171 |
| 8,365,679 B2* | 2/2013 | Landphair | G06F 11/30 701/50 |
| 8,671,856 B2* | 3/2014 | Garner | A01C 7/08 111/171 |
| 8,677,914 B2* | 3/2014 | Stark | A01C 7/105 111/900 |
| 8,850,995 B2* | 10/2014 | Garner | A01C 7/127 111/11 |
| 8,850,998 B2* | 10/2014 | Garner | A01C 7/16 111/171 |
| 8,868,300 B2* | 10/2014 | Kocer | A01C 21/005 111/178 |
| 8,910,581 B2* | 12/2014 | Bassett | A01C 7/208 111/194 |
| 9,226,442 B2* | 1/2016 | Grimm | A01C 7/06 |
| 10,064,325 B2* | 9/2018 | Grimm | A01C 23/022 |
| 10,076,075 B1* | 9/2018 | Muff | A01C 23/027 |
| 10,111,415 B2* | 10/2018 | Kolb | B05B 12/122 |
| 10,863,667 B2* | 12/2020 | Schlipf | F16K 11/0873 |
| 2013/0269578 A1* | 10/2013 | Grimm | A01C 7/06 111/127 |
| 2014/0048002 A1* | 2/2014 | Grimm | A01C 7/06 111/127 |
| 2015/0027044 A1* | 1/2015 | Redden | A01M 21/043 47/58.1 R |
| 2016/0106025 A1* | 4/2016 | Nelson | A01C 5/064 111/164 |
| 2016/0360692 A1 | 12/2016 | McCloskey | |
| 2017/0049043 A1* | 2/2017 | Muff | B05B 1/20 |
| 2017/0118908 A1* | 5/2017 | Ritland | B05B 13/005 |
| 2017/0245425 A1* | 8/2017 | Grimm | A01C 23/008 |
| 2017/0251656 A1* | 9/2017 | Kolb | A01C 23/023 |
| 2018/0192577 A1* | 7/2018 | Smith | A01C 7/20 |
| 2019/0053419 A1* | 2/2019 | Schoeny | A01C 7/102 |
| 2019/0053421 A1* | 2/2019 | Schoeny | A01C 7/206 |
| 2019/0059204 A1* | 2/2019 | Kowalchuk | A01C 7/127 |
| 2019/0166754 A1* | 6/2019 | Johnson | A01C 21/005 |
| 2020/0253110 A1* | 8/2020 | Schlipf | A01C 21/007 |
| 2022/0240442 A1* | 8/2022 | Hubner | G01F 1/36 |

* cited by examiner

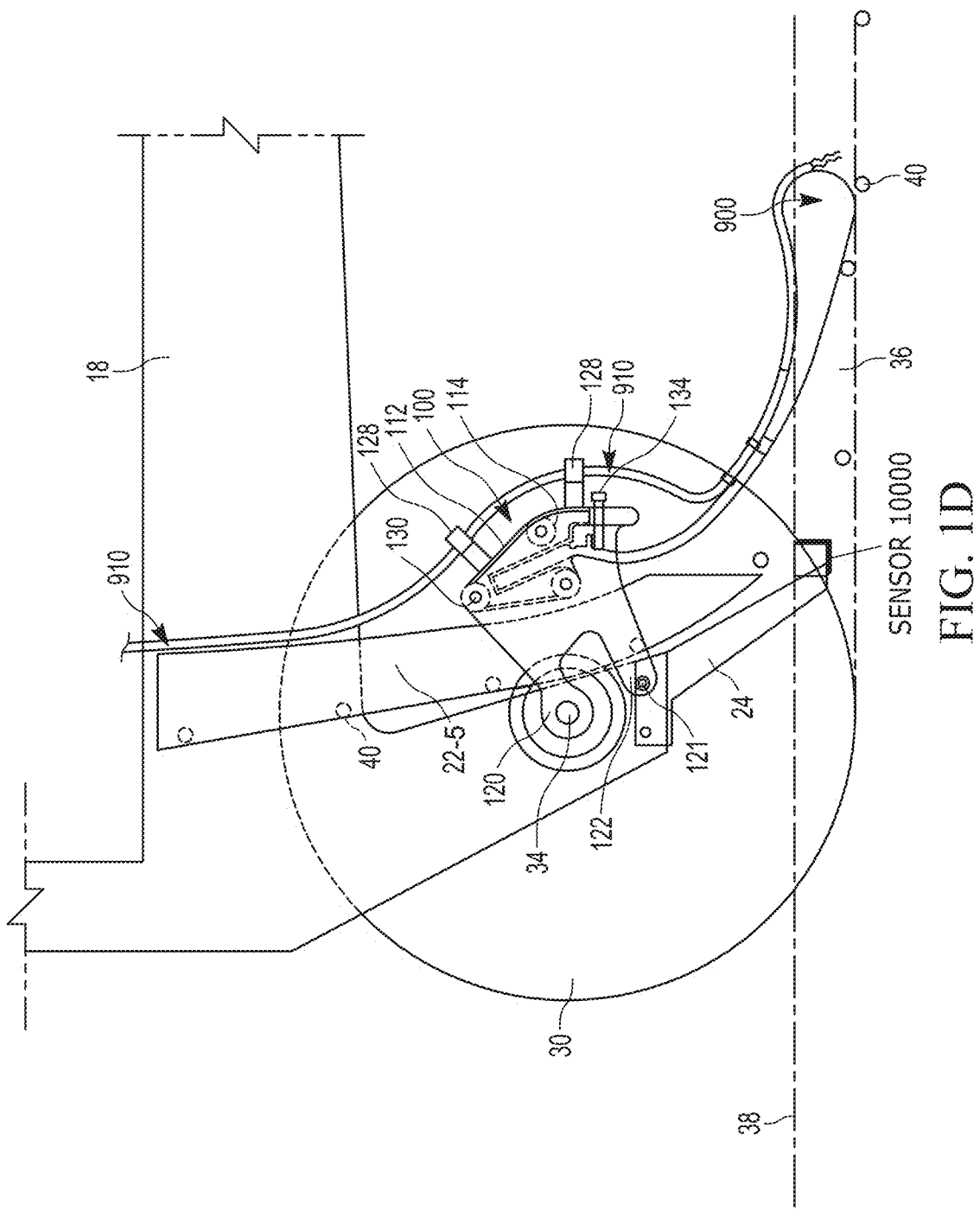

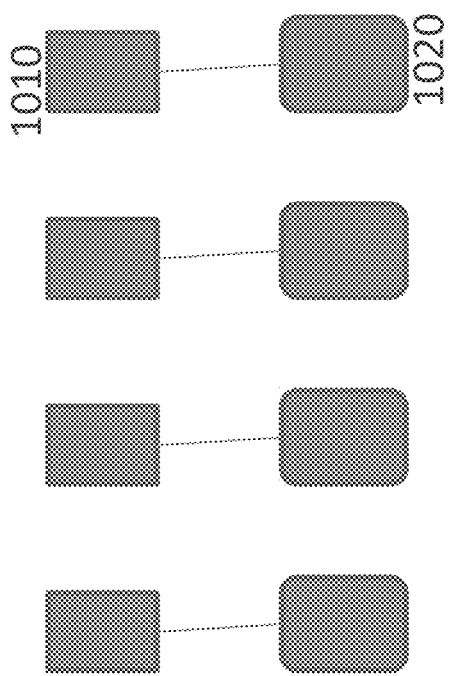

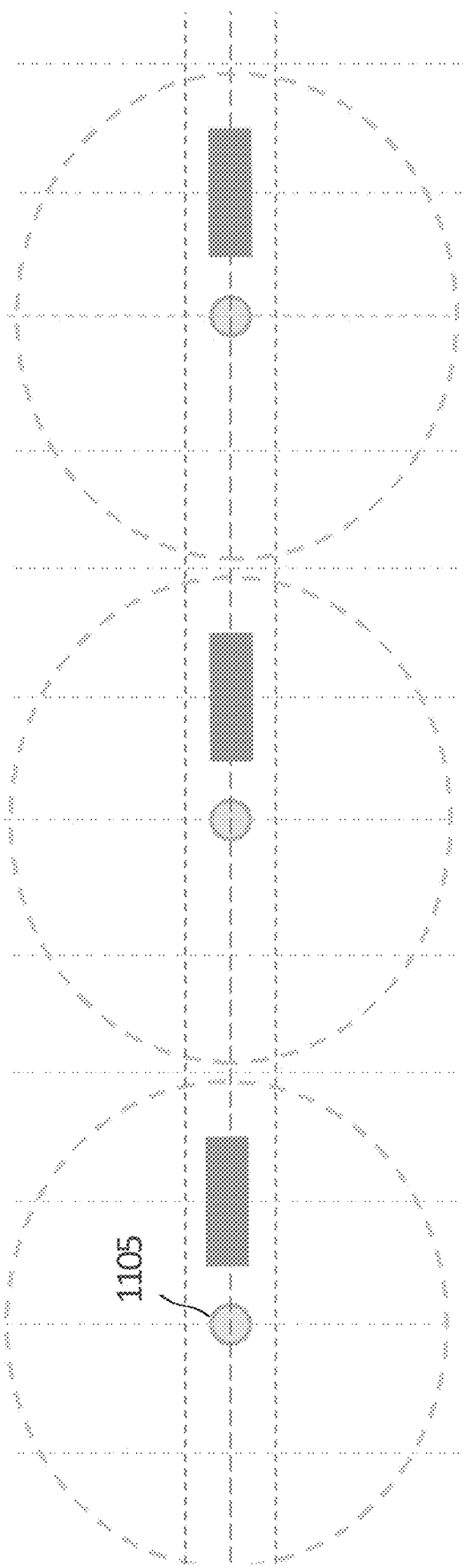

2.5 GPA
5 GPA
10 GPA
20 GPA

TARGETED FLUID/SOLID DISPENSING BASED ON SENSED SEED DATA OR SENSED PLANT DATA

CROSS REFERENCE TO RELATED APPLICATIONS

This application is a divisional application of U.S. application Ser. No. 16/756,434, filed 15 Apr. 2020, which is a national stage entry of PCT Application No. PCT/US2018/049540, filed 5 Sep. 2018, which claims the benefit of U.S. Provisional Application No. 62/554,448 filed on Sep. 5, 2017 entitled: TARGETED FLUID/SOLID DISPENSING and U.S. Provisional Application No. 62/567,715 filed on Oct. 3, 2017 entitled: TARGETED FLUID/SOLID DISPENSING, all of which are incorporated by reference herein.

TECHNICAL FIELD

Disclosed are seed sensors for determining seed placement in a furrow to then target at least one of fluid and solid application with respect to the seed. Also disclosed are plant sensors for determining location of plants within a field and then targeting at least one of fluid and solid application with respect to the plant.

BACKGROUND

It is known to use the seed sensors in a seed tube to detect a seed and then use time to determine the placement of the seed in the furrow once the seed has left the seed tube. Knowing the seed location in the furrow allows for fluid application to apply fluids on the seed or adjacent to the seed. Examples of these systems can be found in U.S. Pat. Nos. 7,370,589, 8,074,585, 9,226,442, US20160073576, US20130269578, U.S. Pat. No. 8,868,300, US20160106025, U.S. Pat. Nos. 8,677,914, and 7,270,065.

Detection of plants in a field to then control application of materials in relation to the plants is described in US20150027040, US20150027041, US20150027043, and US20150027044.

BRIEF DESCRIPTION OF THE DRAWINGS

The present disclosure is illustrated by way of example, and not by way of limitation, in the figures of the accompanying drawings and in which:

FIG. 1D shows a placement of a sensor of the frog (shank) according to one embodiment.

FIGS. 10A-10C illustrate a psi range versus volume/second for an architecture that includes flow control devices and pulsing devices in accordance with one embodiment.

FIGS. 11A-I illustrate different microswath options for applying material to seed in a furrow in accordance with one embodiment.

BRIEF SUMMARY

Figure 1A:
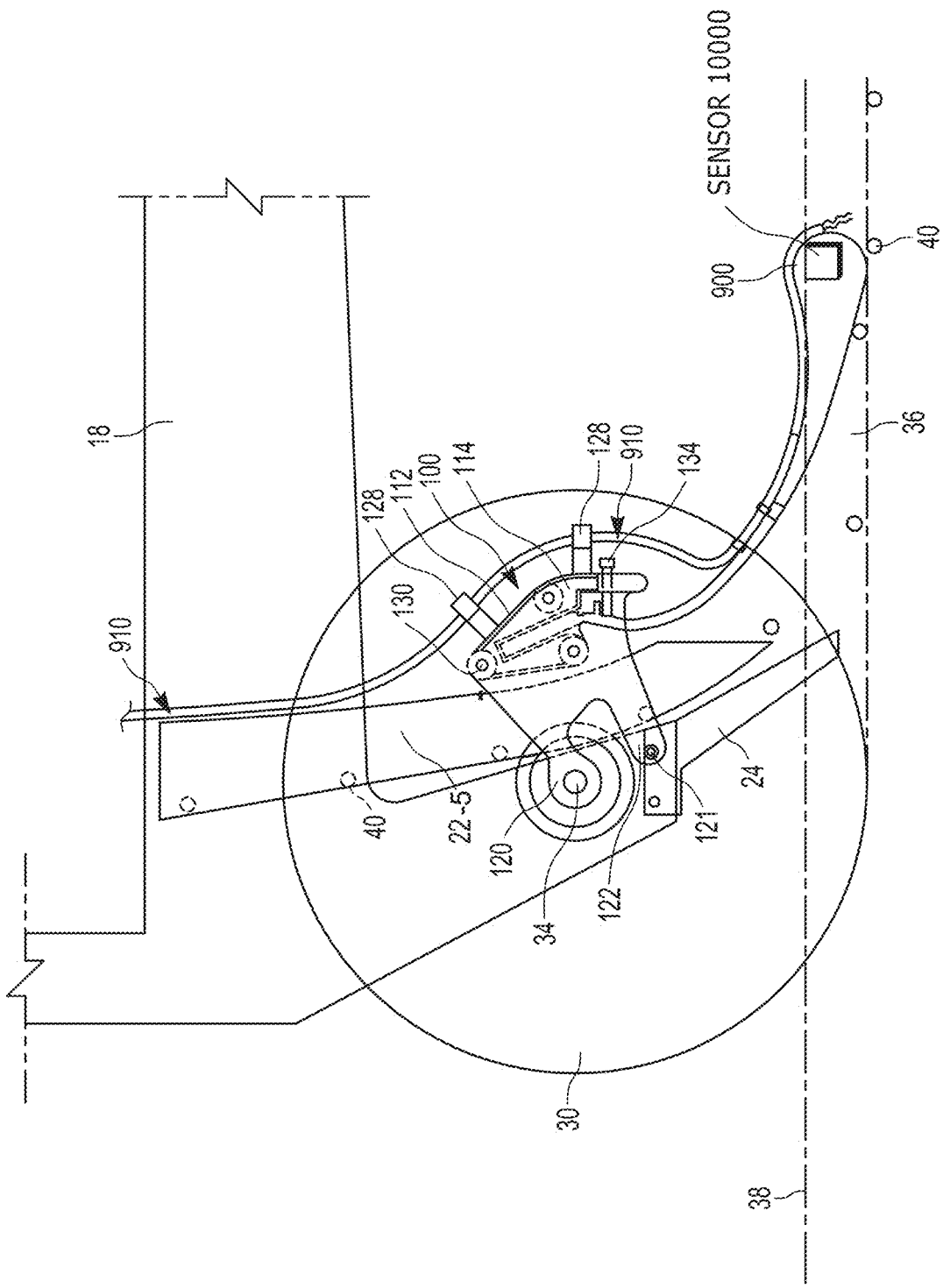
FIG. 1A shows a placement of a sensor in a seed firmer according to one embodiment.

Disclosed are seed sensors for determining seed placement in a furrow to then target fluid/solid application with respect to the seed. Also disclosed are plant sensors for determining location of plants within a field and then targeting fluid/solid application with respect to the plant.

DETAILED DESCRIPTION

All references cited herein are hereby incorporated by reference in their entireties. In the event of a conflict in a definition in the present disclosure and that of a cited reference, the present disclosure controls.

Seed sensing can be done when the seed is in the furrow. While seed sensing has been done in the seed tube, there can still be variations in seed placement in the furrow after the seed is dropped into the furrow. The seed could have some bounce or roll that changes the final location of each seed.

Seed sensing can be conducted by various types of sensors 10000. Examples of sensors 10000 include, but are not limited to, optical (breaking of a light beam), reflectance, electromagnetic, capacitive, acoustic (sound detection reflecting from different surfaces, camera (with analysis of seed/plant location in the picture), temperature/infrared, and LIDAR. An example of a temperature/infrared sensor for seeds is disclosed in U.S. Pat. No. 8,365,679.

Examples of electromagnetic sensors can be found in U.S. Pat. Nos. 6,208,255 and 6,346,888. Examples of reflectance measurement to detect seeds can be found in WO2014153157, WO2015171908, and U.S. Application Nos. 62/436,342, filed on 19 Dec. 2016; 62/446,254 filed on 13 Jan. 2017; and 62/482,116, filed on 5 Apr. 2017. In this embodiment, an implement houses a transmitter and a receiver. The implement can be located near the furrow or in furrow. An example of an in furrow implement is a seed firmer. In another embodiment, the implement is disposed in the furrow but does not contact seeds to firm the seeds.

FIGS. 1A-1E illustrate side elevation views of a bracket assembly 100, 200 shown, by way of example only, installed on an agricultural planter, with one of the gauge wheels and furrow opening discs removed for clarity. The existing bracket assembly 100 comprises a housing 112 having substantially minor-image sides 114. The housing 112 is made of thermoplastic material formed using an injection molding process. The housing 112 further includes conduit supports 128 extending rearwardly and formed integrally with the housing for receiving a liquid conduit 910. The conduit supports 128 support and guide the liquid conduit 910 away from the furrow opening discs 30. To install the bracket assembly 100, the gauge wheels 32 are removed from the row unit. The furrow opening discs 30 are also removed from the opening disc shaft 34. The sides 114 of the housing 112 are mounted on opposing sides of the opening disc shaft 34 by placing the upper ears 120 over the shaft 34. The roll pin 121 securing the tube guard 24 to the row unit frame 18 is removed and lower ears 122 are attached to the seed tube guard 24 by aligning the openings and securing with a bolt and nut connection replacing the removed roll pin. The sides 114 of the housing are then secured together by inserting carriage bolts 130 through the apertures in the sides of the housing 112. Once the bracket assembly 100 is mounted, the upper end of the resilient tool 900 is inserted into a cavity defined by the walls formed in the interior sides of the housing 112. With the resilient tool 900 installed in the housing 112, the adjusting screw 134 is tightened to adjust the position of the lower end of the resilient tool 900 with respect to the lower end of the housing 112, thereby increasing or decreasing the amount of force to be exerted by the resilient tool in the bottom of the seed furrow 36. The furrow opening discs 30 are then replaced and secured to the shaft 34 and the gauge wheels 32 are replaced. If in-furrow liquid application is desired, one end of the liquid conduit 910 is inserted through the conduit supports 128. The liquid conduit 910 extends along the back of the resilient tool 900, terminating at the rearward end of the resilient tool 900. The other end of the liquid conduit 910 is fluidly connected to a liquid supply reservoir (not shown) located on the planter or prime mover. In operation, liquid is pumped from the liquid supply reservoir through the liquid conduit 910 for depositing in the furrow 36 behind the resilient tool 900.

In these embodiments, the implement can be attached to a bracket adjacent to the seed tube 22-5. Examples of a bracket can be found in U.S. Pat. Nos. 6,918,342, 7,497,174, 7,921,787, 8,201,507, and 8,794,164. In these embodiments, the implement can be a seed firmer and disposed in the furrow, as in FIG. 1A, or the implement can have a length such that the sensor is disposed adjacent to the outlet of the seed tube, as in FIG. 1B, or any point between the exit of the seed tube and the placement of the seed firmer, as in FIG. 1C.

In one embodiment, the sensor 10000 can be disposed on the frog 24 (e.g., seed tube guard, shank) and oriented to view the furrow (opposite the direction of travel). This is illustrated in FIG. 1D.

In one embodiment, the sensor 10000 can be disposed at the outlet of the seed tube. This is illustrated in FIG. 1E.

Figure 1B:
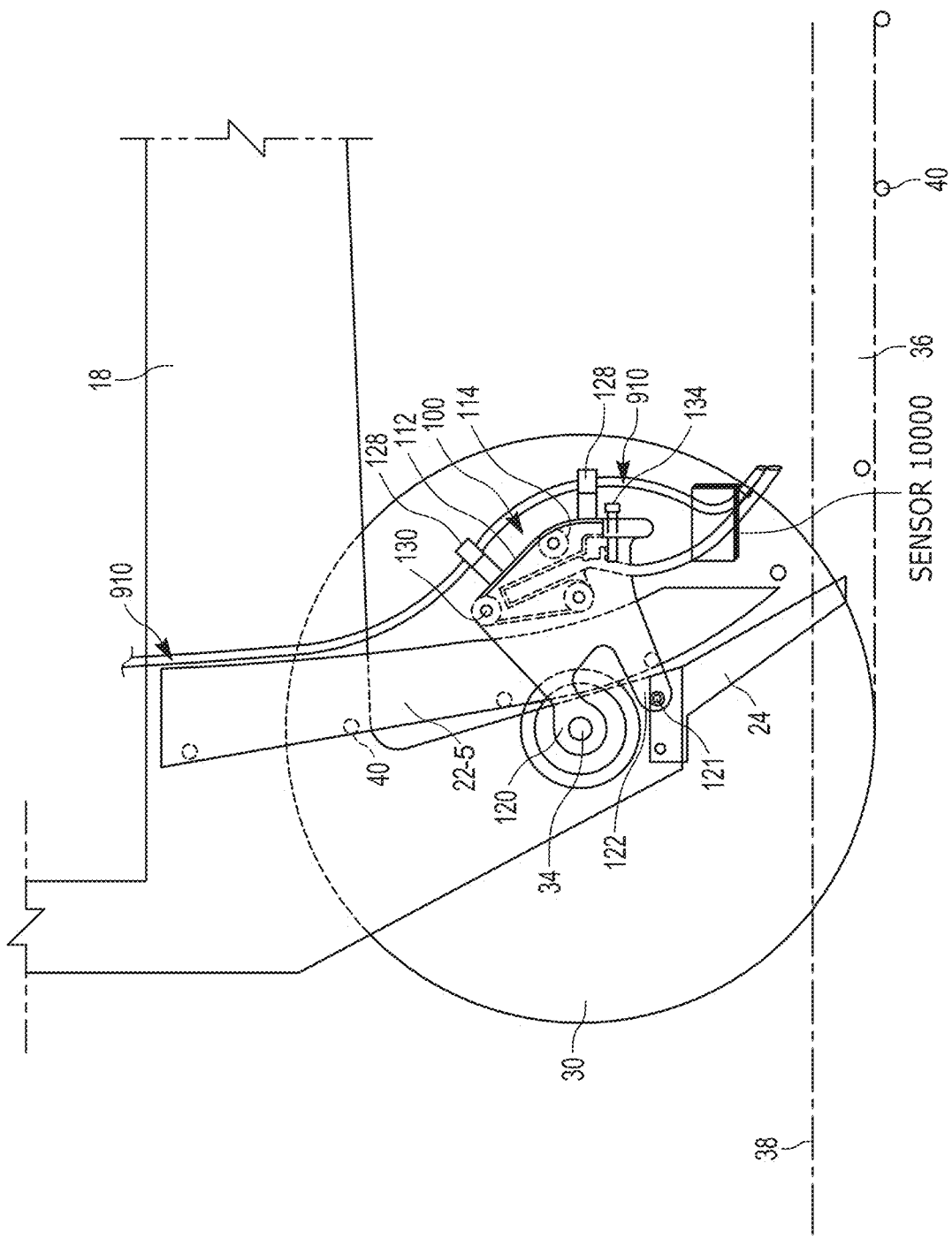
FIG. 1B shows a placement of a sensor on an implement adjacent to the seed tube according to one embodiment.
Figure 1C:
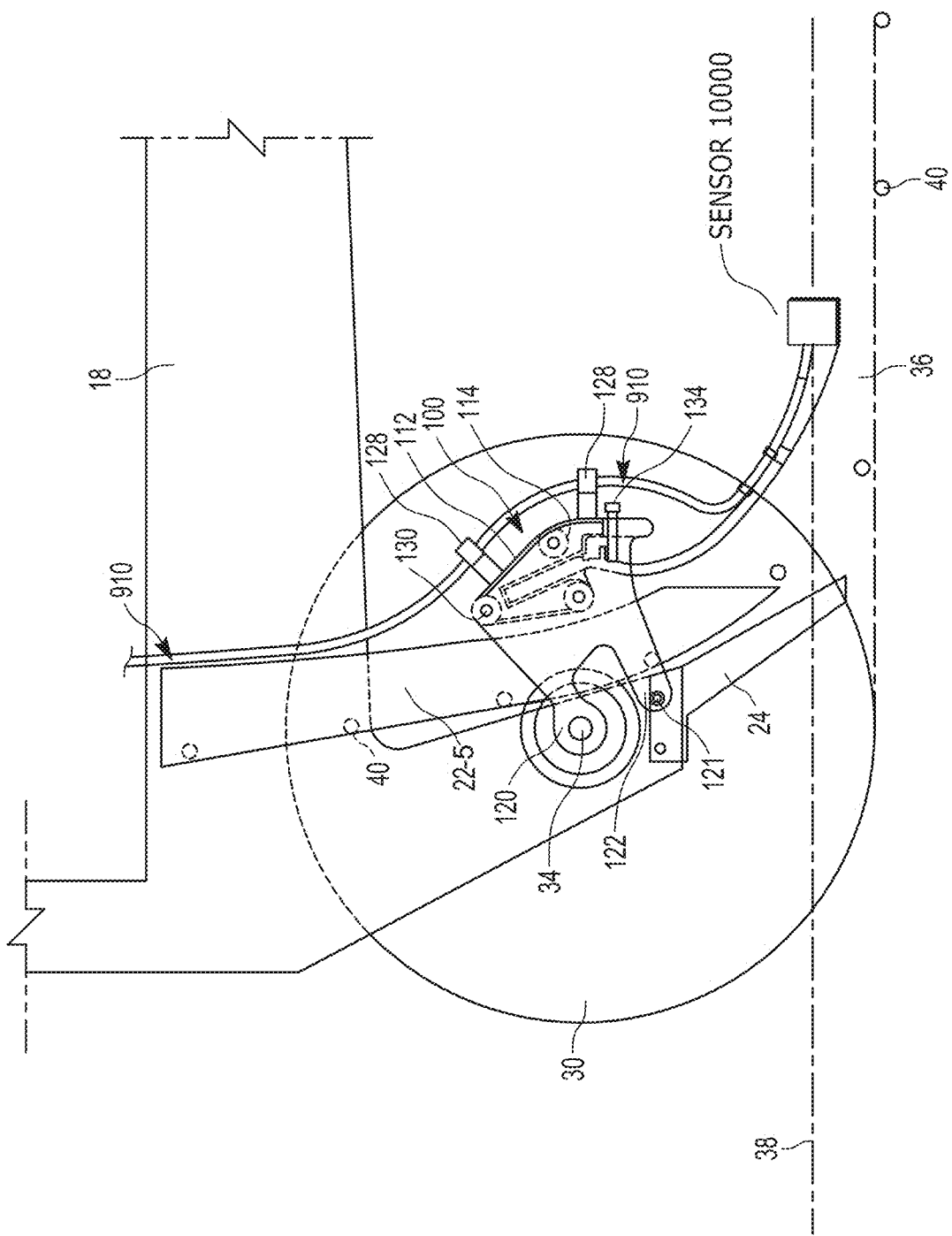
FIG. 1C shows a placement of a sensor on an implement in the furrow but not firming seeds according to one embodiment.
Figure 1E:
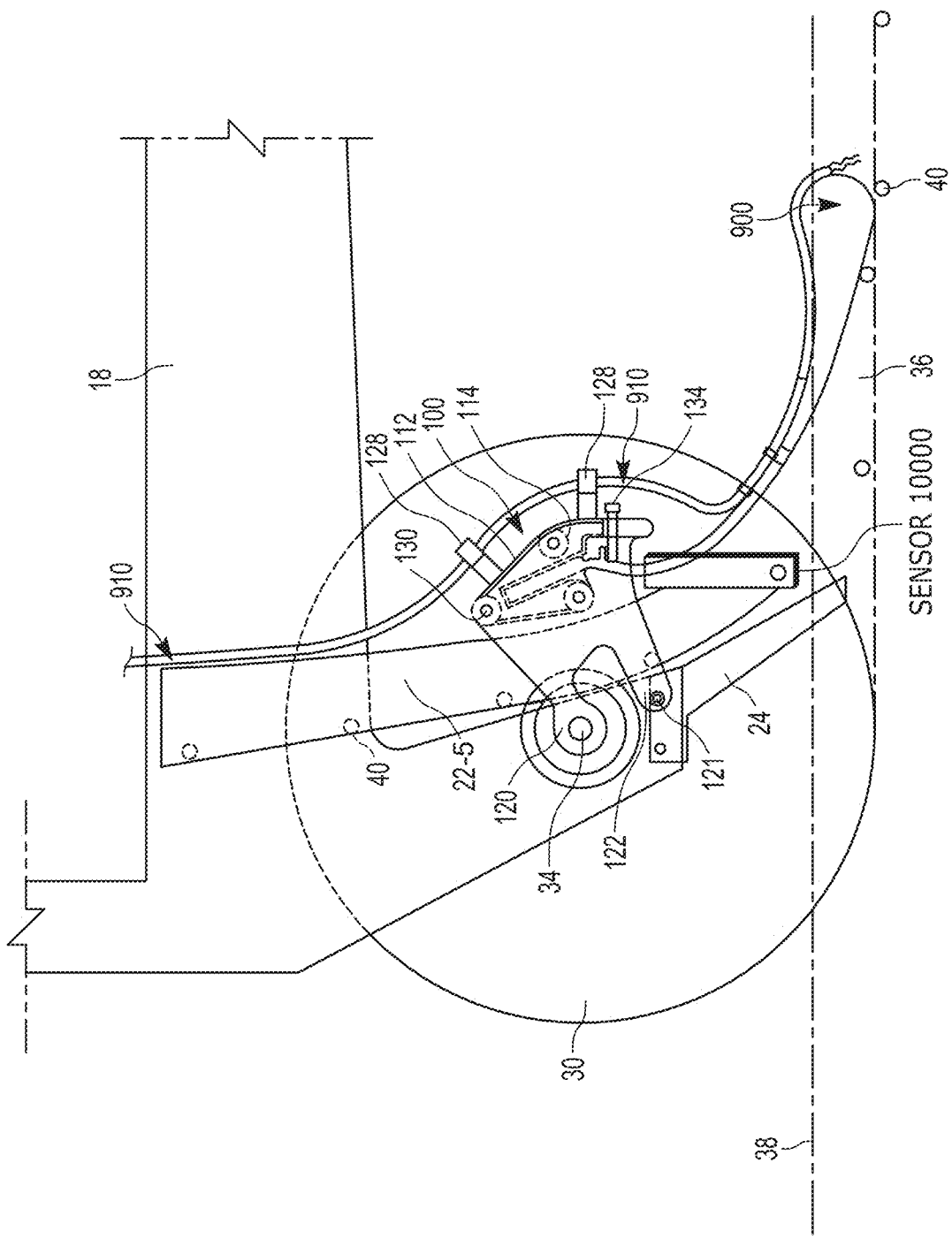
FIG. 1E shows a placement of a sensor at the outlet of the seed tube according to one embodiment.

For the embodiments shown in FIGS. 1B, 1C, and 1E, relative sensor 10000 placement is shown. While illustrated with the one type of bracket, sensor 10000 can be attached to the implement with any other bracket but still have the same relative placement.

Knowing the location of the seed in the furrow, a control device, such as a valve or gate, can be opened or closed to apply a material (fluid or a solid) in relation to the seed in the trench. Materials include, but are not limited to, fertilizer, insecticide, fungicide, and weed killer. Solids include, but are not limited to, powder and granules. The material can applied between the seeds or on the seeds.

Figure 4:
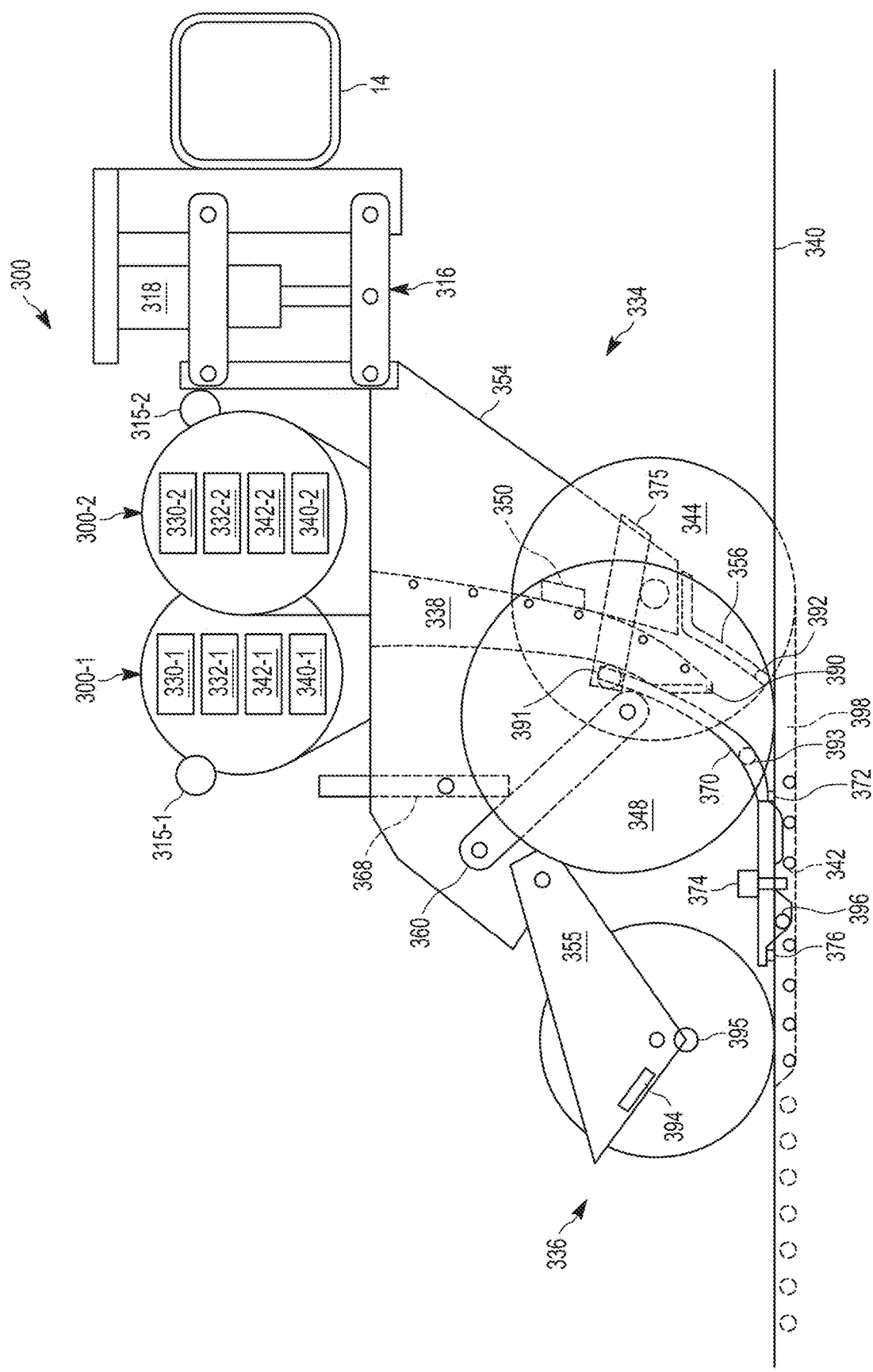
FIG. 4 illustrates an agricultural planter 10 having at least one seed sensor in at least one location in accordance with one embodiment.

FIG. 4 illustrates an agricultural planter 300 having at least one sensor (e.g., seed sensor, plant sensor) in at least one location in accordance with one embodiment. The agricultural planter 300 is preferably pivotally connected to the toolbar 14 by a parallel linkage 316. An actuator 318 is preferably disposed to apply lift and/or down force on the row unit 300. An opening system 334 preferably includes two opening discs 344 rollingly mounted to a downwardly-extending shank 354 and disposed to open a v-shaped trench 388 or furrow in the soil 340. A pair of gauge wheels 348 is pivotally supported by a pair of corresponding gauge wheel arms 360. The height of the gauge wheels 348 relative to the opener discs 344 sets the depth of the trench 388. A depth adjustment rocker 368 limits the upward travel of the gauge wheel arms 360 and thus the upward travel of the gauge wheels 348. A down force sensor (not shown) is preferably configured to generate a signal related to the amount of force imposed by the gauge wheels 348 on the soil 340; in some embodiments the down force sensor comprises an instrumented pin about which the rocker 368 is pivotally coupled to the row unit 300.

Continuing to refer to FIG. 4, a first seed meter 300-1, is preferably mounted to the row unit 300 and disposed to deposit seeds 342 into the trench 398, e.g., through a seed tube 338 disposed to guide the seeds toward the trench. In other embodiments, the seed tube 338 is replaced with a seed conveyor, such as a flighted belt or brush belt, such as seed conveyors disclosed in U.S. Pat. Nos. 6,681,706; 7,918,168; 8,671,856; 8,850,995; 8,850,998; and International Patent Publication No. WO2013/049198. An optional second seed meter 300-2 is preferably mounted to the row unit 300 and disposed to deposit seeds 342 into the same trench 388, e.g., through the same seed tube 338. Each of the seed meters 300-1, 300-2 preferably includes a seed side housing 330-1, 330-2 having an auxiliary hopper 332-1, 332-2 for storing seeds 342 to be deposited by the meter. Each of the seed meters 300-1, 300-2 preferably includes a vacuum side housing 340-1, 340-2 including a vacuum port 342-1, 342-2 pulling a vacuum within the vacuum side housing. Each of the seed meters 300-1, 300-2 preferably includes a seed disc that includes seed apertures (not shown). The seed disc preferably separates interior volumes of the vacuum side housing and the seed side housing. In operation, seeds 342 communicated from the auxiliary hopper 332-1, 332-2 into the seed side housing 330-1, 330-2 are captured on the seed apertures due to the vacuum in the vacuum side housing and then released into the seed tube 338. Each of the meters is preferably powered by individual electric drives 315-1, 315-2 respectively. Each drive is preferably configured to drive a seed disc within the associated seed meter. In other embodiments, the drive 315 may comprise a hydraulic drive or other motor configured to drive the seed disc.

A seed sensor 350 (e.g., an optical or electromagnetic seed sensor configured to generate a signal indicating passage of a seed) is preferably mounted to the seed tube 338 and disposed to send light or electromagnetic waves across the path of seeds 342. A closing system 336 including one or more closing wheels is pivotally coupled to the row unit 300 and configured to close the trench 388.

In one example, a seed firmer 370 is coupled to a component (e.g., shank 354) of the row unit 300 with a bracket 375. The seed firmer is preferably designed to resiliently engage the bottom of the trench 398 in order to press seeds 342 into the soil before the trench is closed. The seed firmer 370 also includes a seed orientation functionality to change an orientation of the seed if desired or necessary. The seed firmer 370 optionally includes a seed vision system 372 (e.g., machine vision, lidar (light detection and ranging)) to determine pre-orientation of the seed after placement in the trench with the seed tube, an actuator 374 to change an orientation of the seed if necessary or desired which may be based on pre-orientation data, and an optional seed vision system 376 (e.g., machine vision, lidar (light detection and ranging)) to determine a post-orientation of the seed after the seed is positioned and potentially oriented with the seed firmer. The post-orientation data of the seed vision system 376 is used to confirm if the seed has a desired seed orientation. The actuator 374 may include at least one of an airstream and one or more mechanical actuators for orientation of the seed in the trench. A sensor 390-396 (e.g., sensor 10000, seed sensor, plant sensor) can be optionally positioned in at least one location to detect seed or seed frequency when the seed exits the seed tube or after the seed exits the seed tube. In another example, the sensor can sense plants and characteristics of plants. The sensor can be mounted at one or more of the following locations including a sensor 390 at a bottom of the seed tube, a sensor 391 at a seed firmer bracket, a sensor 392 within a disc spreader 356 (frog), sensors 393, 396 within a seed firmer, a sensor 394 mounted to the rear of a shank 355 or between the shank and the closing system (e.g., bracket mounts to closing system/ shank bolt interface or the addition of a Yetter-in-between-like adapter bracket), and a sensor 395 mounted to the closing system.

In one embodiment, fluid can be applied through a fluid applicator having at least one sidewall injection conduit for injecting fluid into a sidewall of a trench. An example of this fluid application apparatus can be found in WO2015171915 and WO2016205424, and a commercial embodiment is available from Precision Planting LLC as FurrowJet™ fluid applicator. This fluid applicator can be used in combination with any embodiment described herein or with any of the fluid application systems incorporated herein.

Figure 5A:
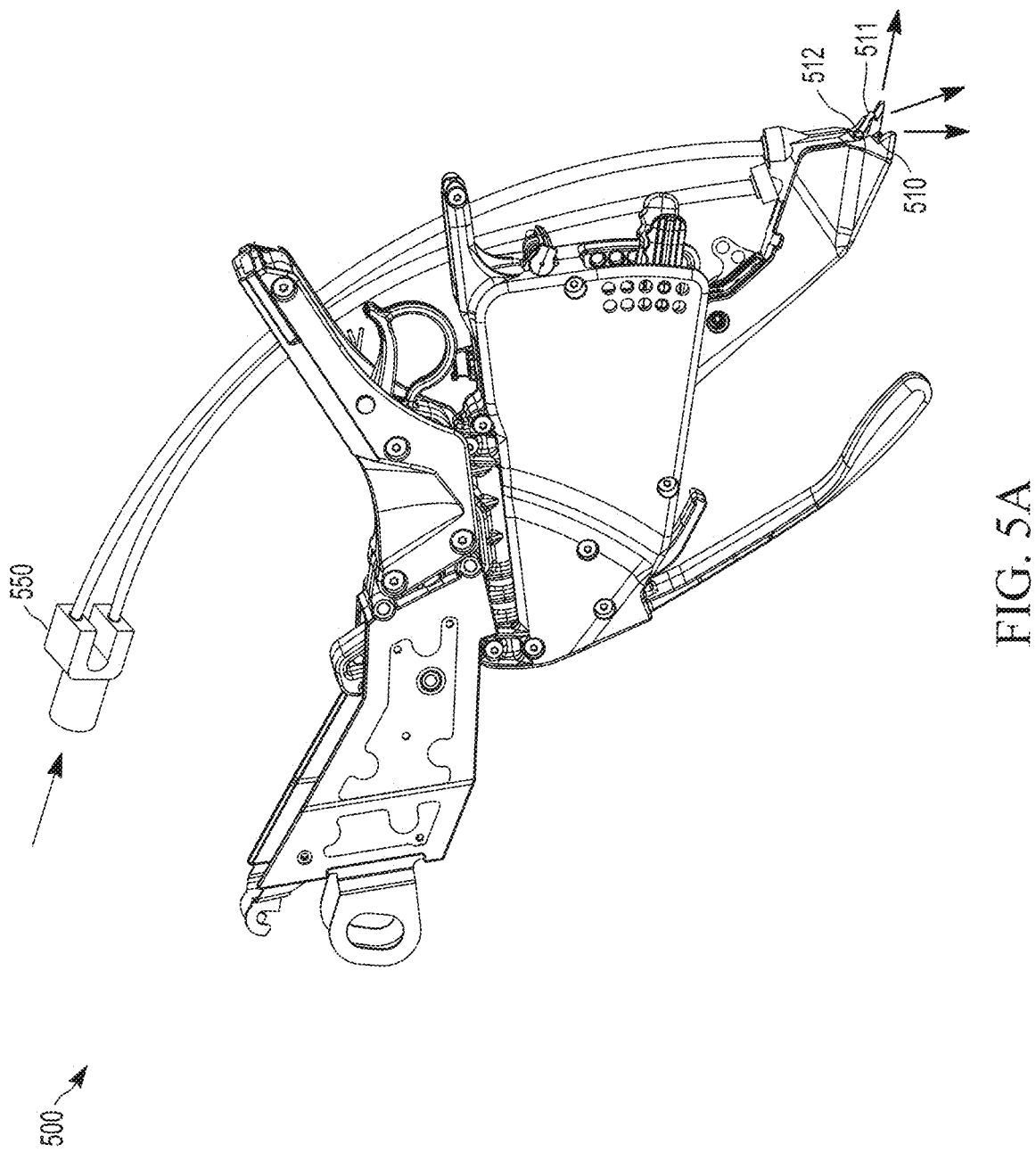
FIGS. 5A and 5B illustrate a fluid application apparatus having center and wing nozzles.
Figure 5B:
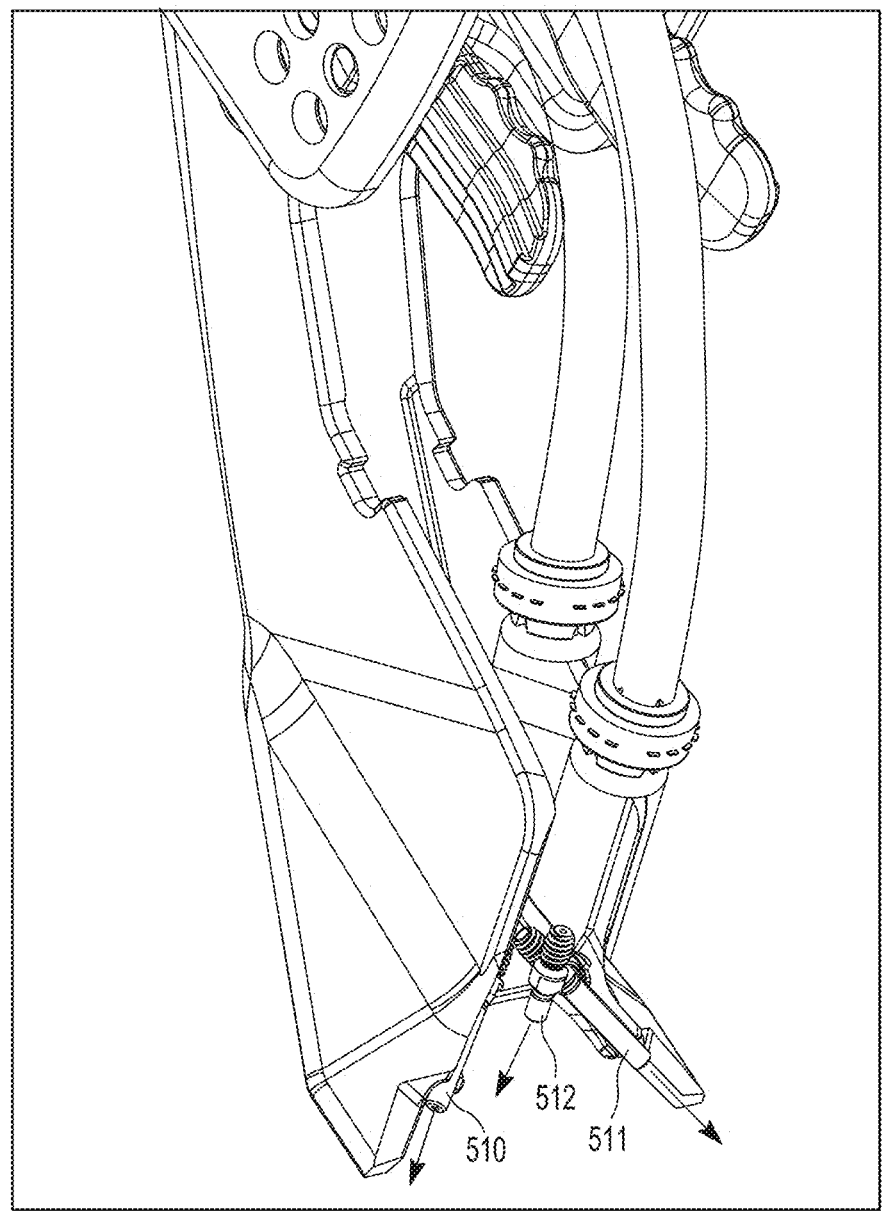

In one embodiment, FIGS. 5A and 5B illustrate a fluid application apparatus having center and wing nozzles. The fluid application apparatus 500 has a center fluid applicator 512 for in furrow delivery and two sidewall (or wing) applicators 510-511 for applying fluid to both sidewalls in the furrow. Flow can be activated/deactivated with a valve to apply fluid in the following combinations.

Figure 2B:
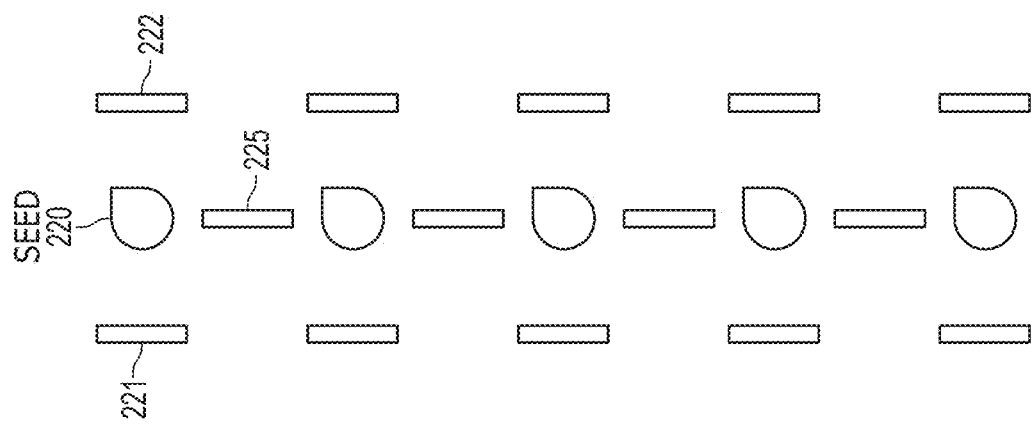
FIGS. 2A to 2D show placement of material relative to the seed using an applicator with sidewall applicators according to several embodiments.
Figure 2A:
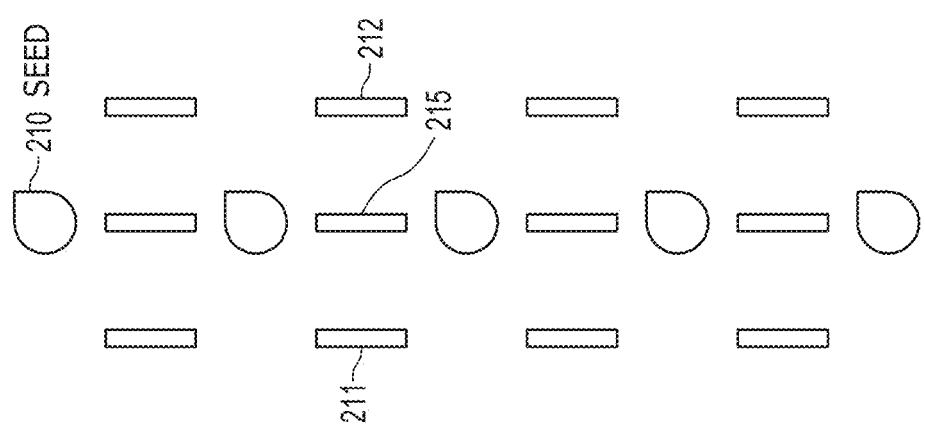
Figure 2D:
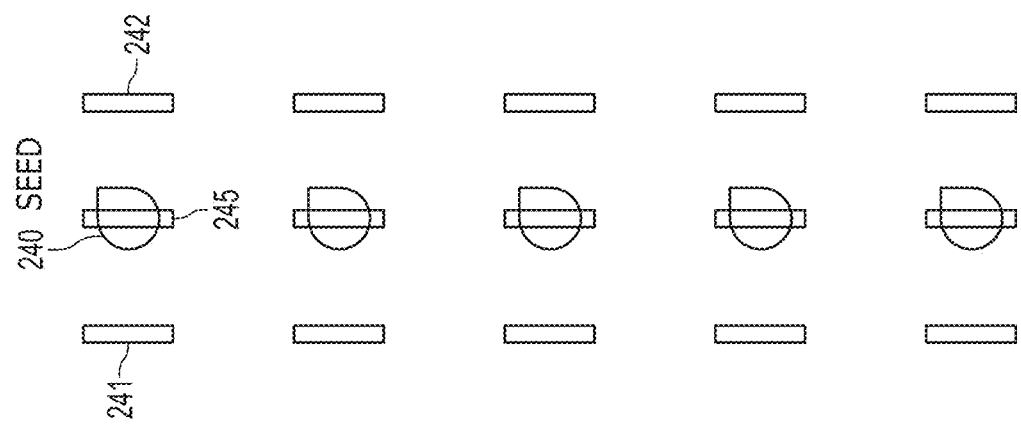
Figure 2C:
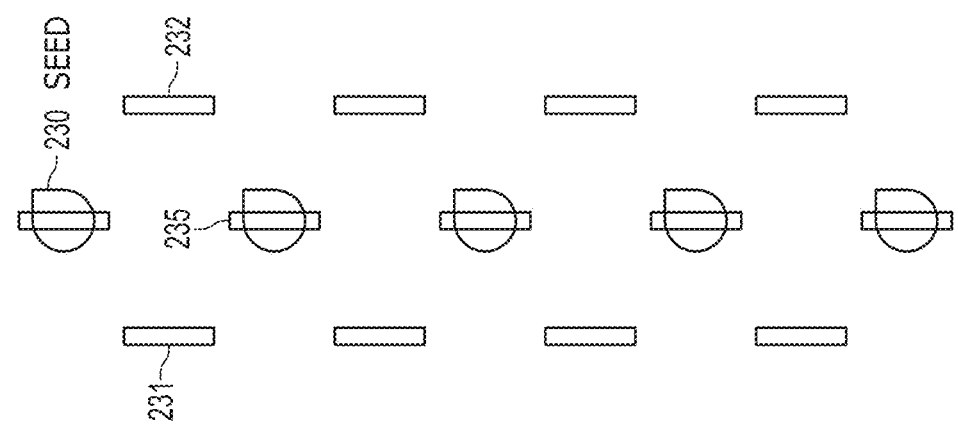

Fluid 215 between the seeds 210 using the center fluid applicator and fluid 211-212 between the seeds in the sidewall using the sidewall applicators, is illustrated in FIG. 2A. Fluid 225 between the seeds 220 using the center fluid applicator and fluid 221-222 adjacent the seeds in the sidewall using the sidewall applicators, is illustrated in FIG. 2B. Fluid 235 on the seeds 230 using the center fluid applicator and fluid 231-232 between the seeds in the sidewall using the sidewall applicators, is illustrated in FIG. 2C. Fluid 245 on the seeds 240 using the center fluid applicator and fluid 241-242 adjacent the seeds in the sidewall using the sidewall applicators, is illustrated FIG. 2D. Flow to the center fluid applicator and the sidewall applicators can be individually controlled, or there can be a diversion of flow from the center fluid applicator to the sidewall applicators, or vice versa, using a rotating valve/ gate that permits flow to one while blocking flow to the other, such as a solenoid activated three way valve.

In one example, the fluid application apparatus enables placing an in-furrow starter fertilizer and also a dual-band of fertilizer ¾" on each side of the seed. The fluid application apparatus rides in the furrow just above the seed, firming while placing starter. Wings on the fluid application apparatus angle downward to cut into the sidewall and place fertilizer alongside the seed in a dual-band. By being near-furrow, this placement gives the seedling and crown roots immediate and continuous access to the nutrients. Combined with accurate placement, the fluid application apparatus is flexible, allowing increased rates and common starters to be applied safely, avoiding seed burn risk.

Figure 3:
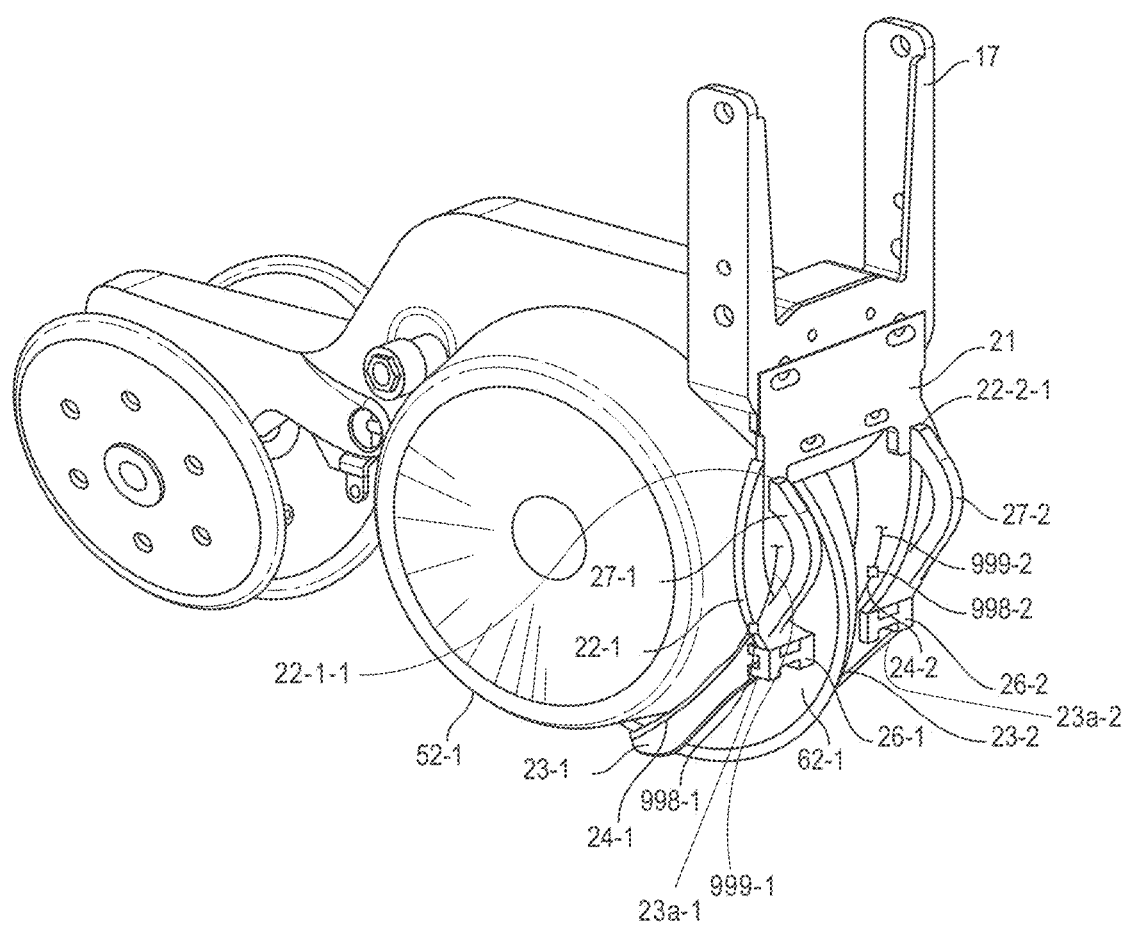
FIG. 3 shows an application implement according to one embodiment.

Another application implement that can be used with targeted application is described in U.S. Application Nos. 62/395,840, filed on 16 Sep. 2016; 62/423,724, filed on 17 Nov. 2016; 62/436,935, filed on 20 Dec. 2016; 62/447,810 filed on 18 Jan. 2017; 62/526,201, filed on 28 Jun. 2017, and PCT/US17/51792 filed on Sep. 15, 2017. An example of this implement is shown in FIG. 3. A knife assembly is disposed on row unit according to one embodiment. Knife assembly includes a knife bracket 21 that is attached to shank bracket 17. Knife assembly can have one or two knives 23. Described herein is knife assembly with two knives 23, but it is understood that one of these knives 23 can be omitted. This can be done when material is only desired to be delivered to one side of a trench.

Knife bracket 21 has knife bracket arms 22-1, 22-2 extending downwardly from knife bracket 21 to knives 23-1 and 23-2 such that knife 23-1 is disposed ahead of the gauge wheel 52-1, and knife 23-2 is disposed ahead of the gauge wheel 52-2. Each knife 23 (23-1, 23-2) has a material delivery conduit 24-1, 24-2. Material delivery conduit 24-1, 24-2 can be connected to a material distribution tube 999 (999-1, 999-2) via coupler 998 (998-1, 998-2). Material distribution tube 999 (999-1, 999-2) is in material communication with a material source (not shown) such as by gravity feed or by a pump (not shown). In one embodiment, knife 23 can be convex in a direction of travel 8000 as shown in FIGS. 8A to 8E with convex edge 29.

The material that can be delivered through the material delivery conduit can be a fluid or a flowable solid. Flowable solids include, but are not limited to, granules and powders. Knife bracket arms 22-1, 22-2 have a first end 22-1-1 and 22-2-1, respectively, at their ends adjacent knife bracket 21, and they have a second end 22-1-2 and 22-2-2, respectively, opposite of the knife bracket 21. At second ends 22-1-2 and 22-2-2, knife bracket arms 22-1 and 22-2 can have a bracket 26-1 and 26-2, respectively, for mounting knives 23-1 and 23-2, respectively, at their first ends 23a-1 and 23a-2, respectively. Optionally, each knife bracket arm 21 can have a second arm 27-1 and 27-2 connecting first ends 22-1-1 and 22-2-1 to second ends 22-1-2 and 22-2-2, respectively. This optional second arm 27 can provide additional structural rigidity to bracket arm 22. Second arm 27 can be oriented transverse to bracket arm 22.

Other application units including Y shaped configurations are illustrated in FIGS. 3A, 8A, 8B, 15A, 15B, and 16 of PCT/US2017/028187.

Figure 6A:
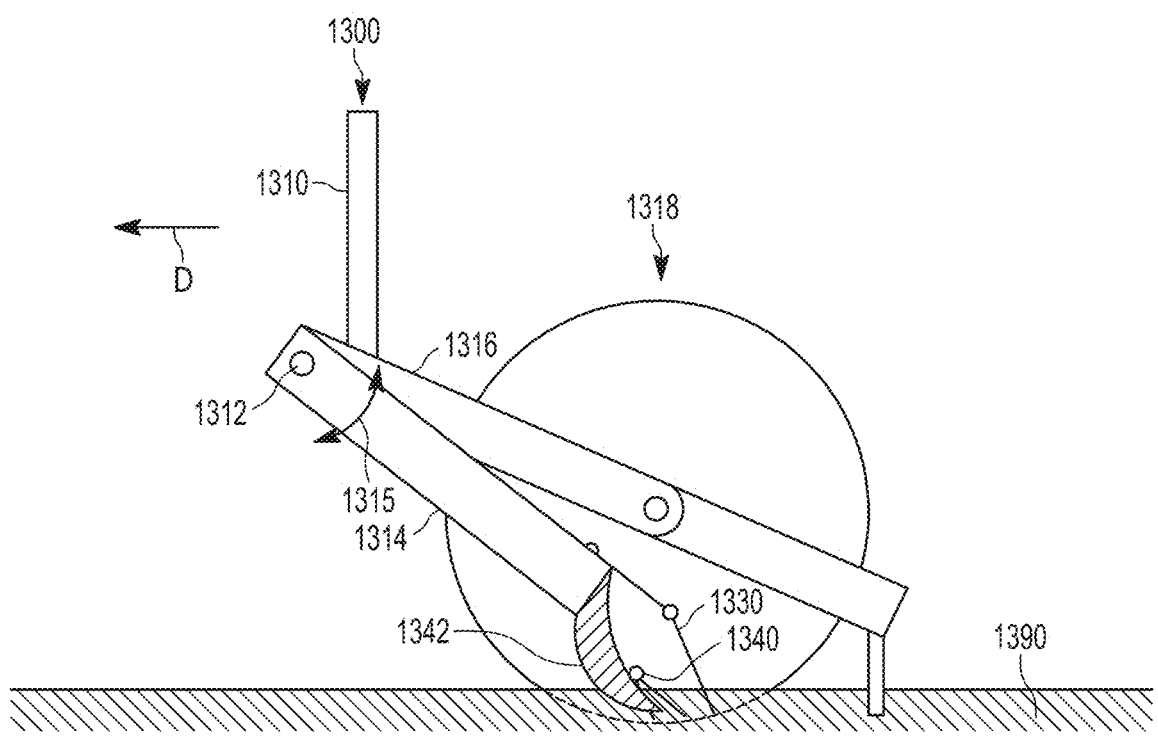
Referring to FIG. 6A (side view), an embodiment of a fluid application unit 1300 is illustrated in accordance with one embodiment.

Referring to FIG. 6A (side view), an embodiment of a fluid application unit 1300 is illustrated in accordance with one embodiment. A tractor or other implement pulls multiple side dressing fertilizer coulter units (e.g., application unit 1300). The crop may be at a seedling stage when fertilizer is typically applied as a side dressing slightly offset laterally from each row of seedlings. Each application unit includes a frame 1310, a member 1316 for supporting a coulter wheel 1318 (e.g., single disc, double disc), a member 1314 for supporting a shallow trench forming member 1342 (e.g., scratching knife 1342) for opening a shallow trench in the soil having a shallow depth (e.g., 0-4 inches, 0-2 inches, approximately 1 inch). The frame 1310 preferably includes an internal or externally mounted conduit (not shown) for applying a crop input (e.g., fluid crop input such as anhydrous or other fertilizer, nutrients, etc.) with a fluid outlet 1340 into the shallow trench. A covering tine 1330 (e.g., rake, closing wheel) closes the shallow trench to retain the crop input in the soil (or ground 1390). A spring pivot 1312 allows the member 1314 and fluid outlet 1340 to pivot with a range of motion 1315 with respect to the member 1316.

Figure 7:
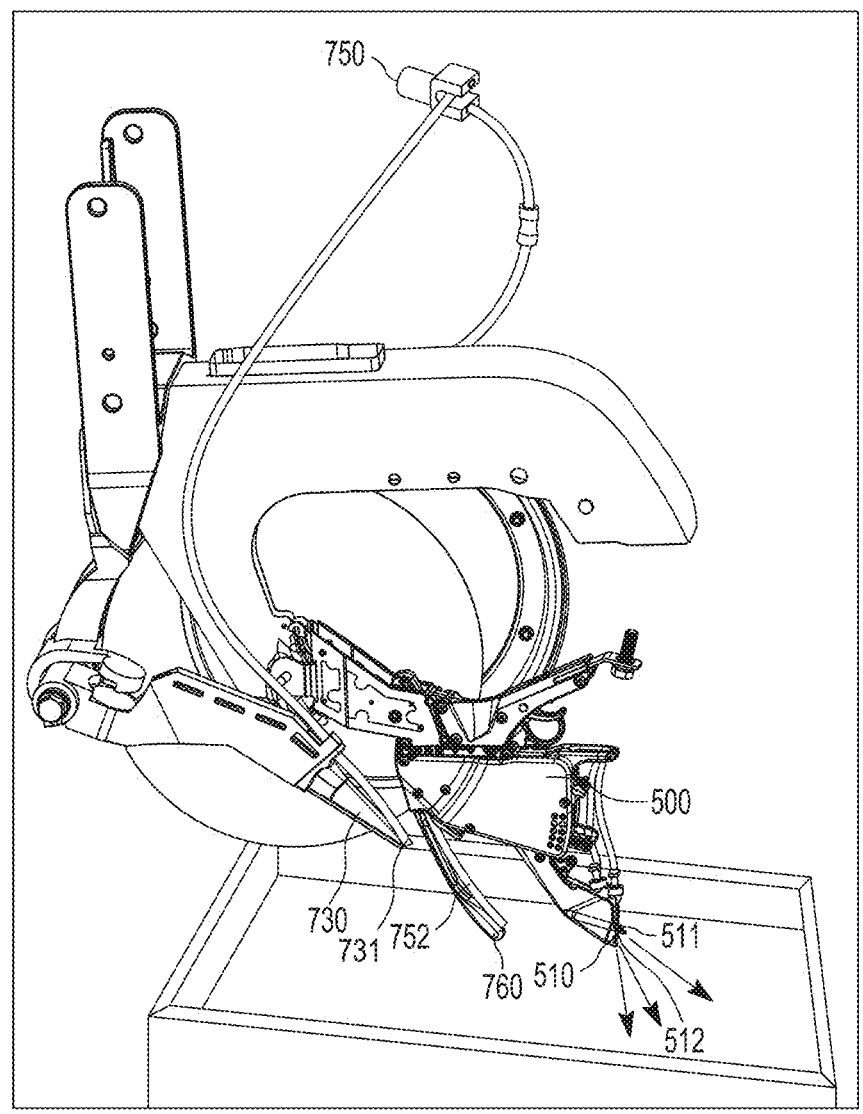
FIG. 7 illustrates a planter system for planting seeds and spraying a material in accordance with one embodiment.

The frame 1310 may comprise an injection assembly (e.g., sidedress liquid fertilizer injection assembly or anhydrous injection assembly) such as those illustrated in FIG. 7 of U.S. Pat. No. 5,890,445, or in U.S. Pat. No. 8,910,581. The frame 1310 and application unit 1300 can be used in combination with any other embodiments of the present disclosure.

In one example, a first sidedress fluid applicator provides a pulsed first fluid material to a first region of a row of plants while a second sidedress fluid applicator provides a continuous spray of a second fluid material to a second different region of the same row of plants. The first and second region are different but may overlap at times. Pulsing the fluid allows placement of micronutrients in close proximity to seed, emerging plants, or foliage of plants.

Figure 6B:
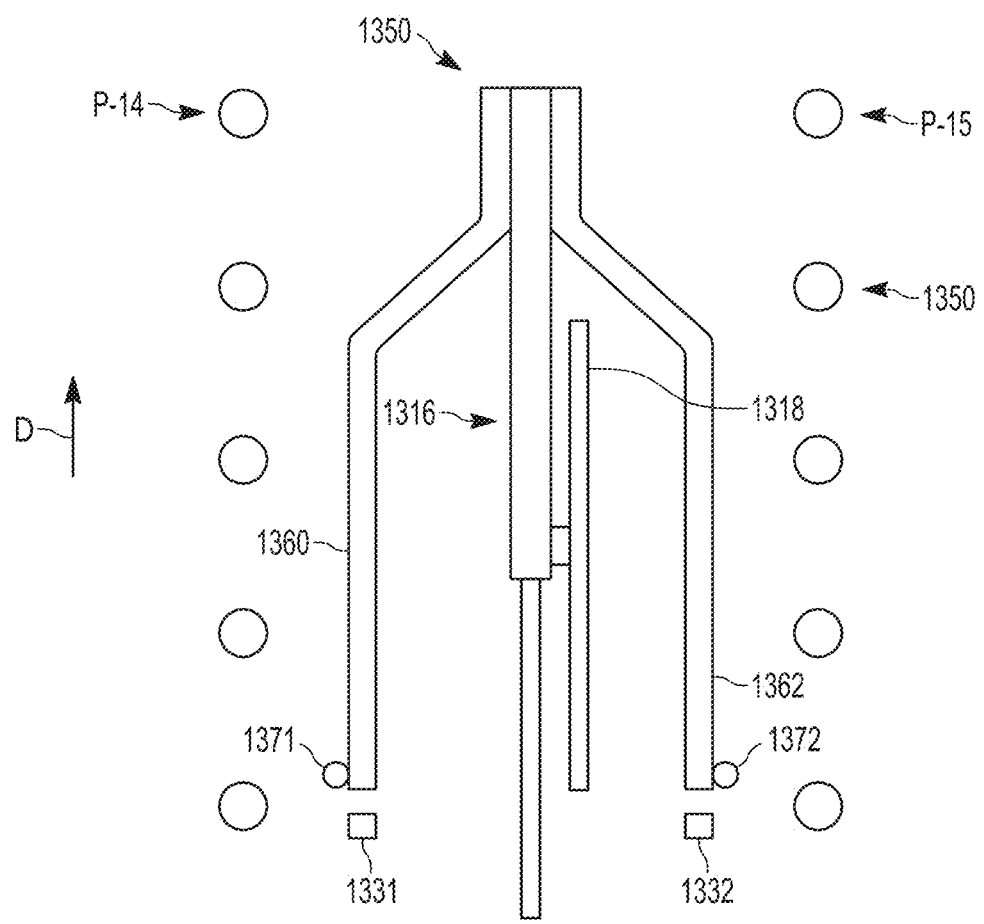
FIG. 6B (top view) illustrates an embodiment of a liquid application unit 1350 having multiple trench forming members (e.g., knives) and fluid outlets in accordance with one embodiment.

FIG. 6B (top view) illustrates an embodiment of a liquid application unit 1350 having multiple trench forming members (e.g., knives) and fluid outlets in accordance with one embodiment. A tractor or other implement pulls multiple side dressing fertilizer coulter units (e.g., application unit 1350) for forming a trench having a depth (e.g., 4-8 inches, approximately 5-7 inches, etc.). The crop may be at a seedling stage when fertilizer is typically applied as a side dressing slightly offset laterally from each row of seedlings. Each application unit includes a frame (not shown), a coulter wheel 1318 for forming a deeper trench having a depth (e.g., 4-8 inches, approximately 5-7 inches, etc.), a trench forming member 1360 (e.g., scratching knife 1360) for opening a shallow trench having a shallow depth (e.g., 0-4 inches, 0-2 inches, approximately 1 inch) in proximity to a row of plants P-14, and a trench forming member 1362 (e.g., scratching knife 1362) for opening a shallow trench having a shallow depth (e.g., 0-4 inches, 0-2 inches, approximately 1 inch) in proximity to a row of plants P-15. The frame preferably includes an internal or externally mounted conduit (not shown) for applying a crop input (e.g., fluid crop input such as anhydrous or other fertilizer, nutrients, etc.) with fluid outlets 1371-1372 into a respective trench. Each knife may be associated with a respective covering tine 1331-1332 (e.g., rake, closing wheel) for closing the shallow trench to retain the crop input in the soil (or ground) and prevent the crop input from being volatilized.

FIG. 7 illustrates a planter system for planting seeds and spraying a material in accordance with one embodiment. A seeding meter dispenses seed through a seed tube or other device. A sensor (e.g., 10000, 390-396) detects seed or seed frequency including sensed seed pulses. A spray system (e.g., fluid application apparatus 500, fluid applicator 730, seed firmer 760) sprays in response to receiving a signal that is based on sensed seed pulses. The spray system dispenses the material with one or more dispensing devices containing at least first, second, and third material dispensing locations (e.g., 510-512, 731, 752, 1371-1372). The fluid applicator 730 (e.g., knife assembly with knives 23 and fluid lines 24-1, 24-2 of FIG. 3) is visible in FIG. 7 due to removal of certain components such as gauge wheel 52.

A flow diverting device 750 (e.g., device 550 of FIG. 5A) diverts flow between first and second material dispensing locations to only dispense one location at a time. In one example, the flow diverting device enables flow during a certain region of a field for a first material dispensing location and enables flow during a different region of a field for a second material dispensing location. A control system (e.g., any control system on an implement or tractor, CMU) uses the sensed seed pulses to command the spray system to spray the material either by synchronizing with the seed pulses or a direct relationship between a sensed seed pulse and pulsed spray (e.g., one to one correspondence between sensed seed pulse and pulsed spray).

In another embodiment, a planter system for planting seeds and spraying a material comprises a seeding meter for dispensing seed through a seed tube or other device, a sensor to detect seed or seed frequency including sensed seed pulses, and a spray system to spray in response to receiving a signal that is based on sensed seed pulses. The spray system dispenses the material with one or more dispensing devices containing at least first and second material dispensing locations. A flow diverting device can divert flow between first and second material dispensing locations to only dispense one location at a time. A control system uses the sensed seed pulses to command the spray system to spray the material either by synchronizing with the seed pulses or a direct relationship between a sensed seed pulse and pulsed spray. In other words, upon detection of a sensed seed pulse, a pulsed spray occurs immediately or approximately immediately upon detection of the sensed seed pulse.

In one example, the spray system comprises at least one of a downstream on-off pulse width modulated valve and a voice coil actuated valve.

In another embodiment, a planter system for planting seeds and spraying a material comprises a seeding meter for dispensing seed through a seed tube or other device, a sensor to detect seed or seed frequency including sensed seed pulses, a spray system to spray the material in response to receiving a signal that is based on sensed seed pulses, a continuously rotating dispensing system having an orifice that opens and closes in response to rotation of the dispensing system, and a control system to use the sensed seed pulses to command the spray system to dispense fluid by synchronizing the rotational speed of rotating dispensing system with a seed pulse frequency of the sensed seed pulses.

Figure 8A:
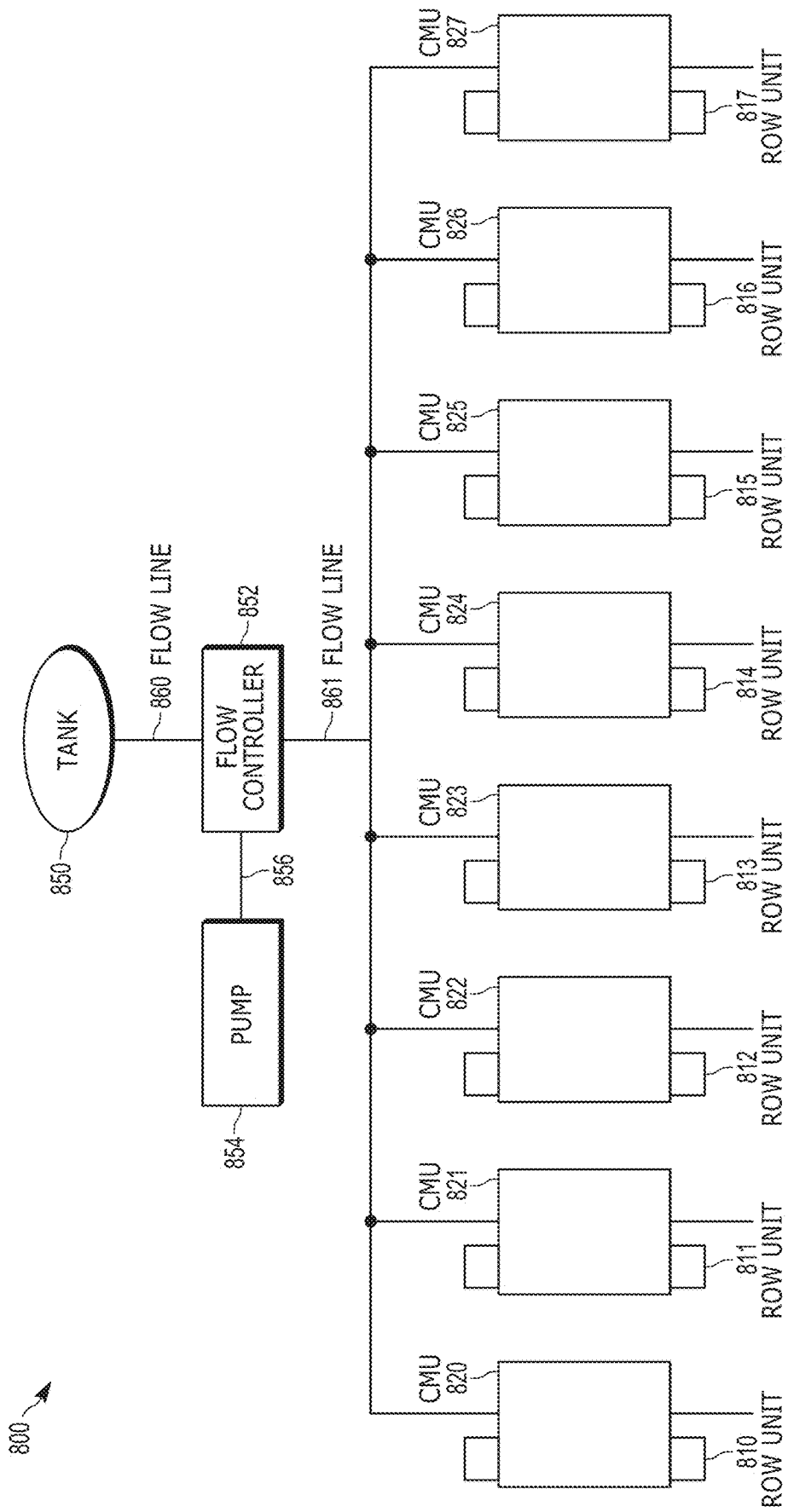
FIG. 8A illustrates an architecture of an implement 800 for controlling and monitoring applications (e.g., liquid applications, fluid mixture applications) in one embodiment.

FIG. 8A illustrates an architecture of an implement 800 for controlling and monitoring applications (e.g., liquid applications, fluid mixture applications) in one embodiment. The implement 800 includes at least one storage tank 850, flow lines 860 and 861, a flow controller 852 (e.g., valve), and at least one variable-rate pump 854 (e.g., electric, centrifugal, piston, etc.) for pumping and controlling application rate of a liquid (e.g., liquid application, semiliquid mixture) from the at least one storage tank to different control and monitoring units (CMUs) 820-827 (e.g., flow devices 820-827) of row units 810-817, respectively of the implement. In one example, each row unit includes a CMU for controlling and monitoring a liquid (e.g., flow rate of a liquid) applied to soil or crops of a field.

In one example, the variable-rate pump 854 controls pumping of a liquid from the storage tank 850 to each of the CMUs. In another example, the implement 800 includes multiple storage tanks. The pump 854 controls pumping of a first liquid (e.g., first type of fertilizer) from the storage tank 850 to each of the CMUs and controls pumping of a second liquid (e.g., second type of fertilizer) from an additional storage tank 850 to each of the CMUs.

In another example, the implement 800 includes multiple control pumps. Each control pump includes a section or group of row units. A first control pump may control CMUs 820-823 while a second control pump controls CMUs 824-827. The control pump may have a flow rate range of 0.5 to 30 gallons per minute (gpm) while a CMU may have a flow rate range of 0.05 to 3 gpm.

In another example, a pump includes an external flow control and external sensors. Each CMU (e.g., flow device) includes row by row sensing, monitoring, and mapping functionality. Liquid application data can be used for generating user interfaces that show a field map of liquid application. For example, a first region of a field may have an application of 100 units of nitrogen and a second region of a field has an application of 50 units of nitrogen. These data can be compared or overlaid with other data such as yield data. Each CMU may also provide row by row control functionality for swath control if desired to turn off liquid application for region(s), turn compensation for compensation of flow rate during a turn of the implement, and variable rate for liquid application such that each row unit can set its flow rate independent of other row units. The valve and dual passages eliminate orifices of the flow device (e.g., CMU).

Figure 8B:
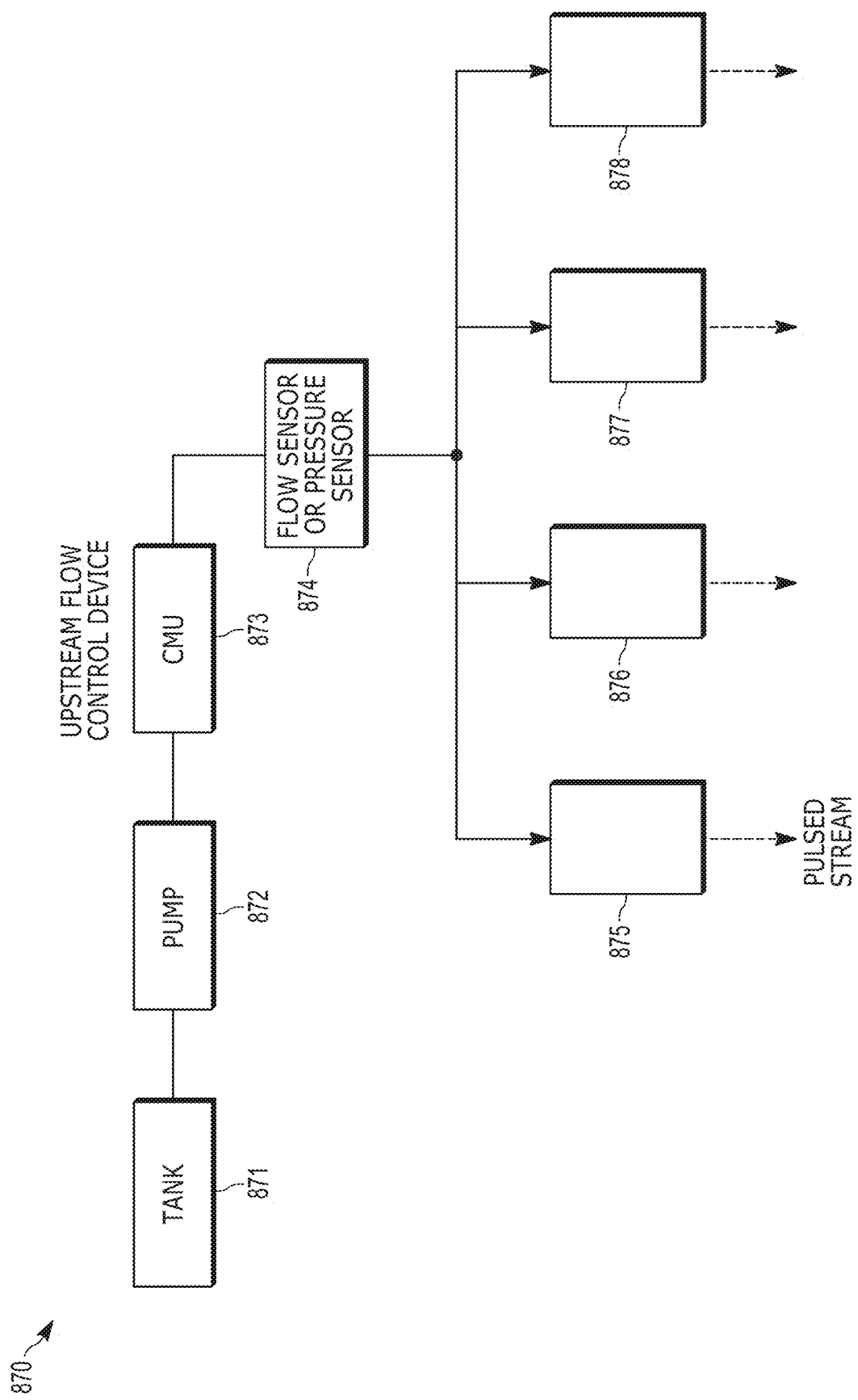
FIG. 8B illustrates an architecture of an implement 870 for controlling and monitoring applications (e.g., pulsed liquid applications, pulsed fluid mixture applications) in one embodiment.

FIG. 8B illustrates an architecture of an implement 870 for controlling and monitoring applications (e.g., pulsed liquid applications, pulsed fluid mixture applications) in one embodiment. The implement 870 includes at least one storage tank 871, flow lines, an upstream flow control device 873 (e.g., CMU 873), a flow sensor or pressure sensor 874, and at least one variable-rate pump 872 (e.g., electric, centrifugal, piston, etc.) for pumping and controlling application rate of a liquid (e.g., pulsed liquid application, pulsed semiliquid mixture) from the at least one storage tank to different downstream pulsing devices 875-875 (e.g., PWM valves, rotary dispensing system, voice coil actuated valve). The device 873 controls flow by varying fluid restriction to control outlet pressure. The device 873 may include a variable orifice flow control or a pump speed (pressure or flow) control system.

Figure 8C:
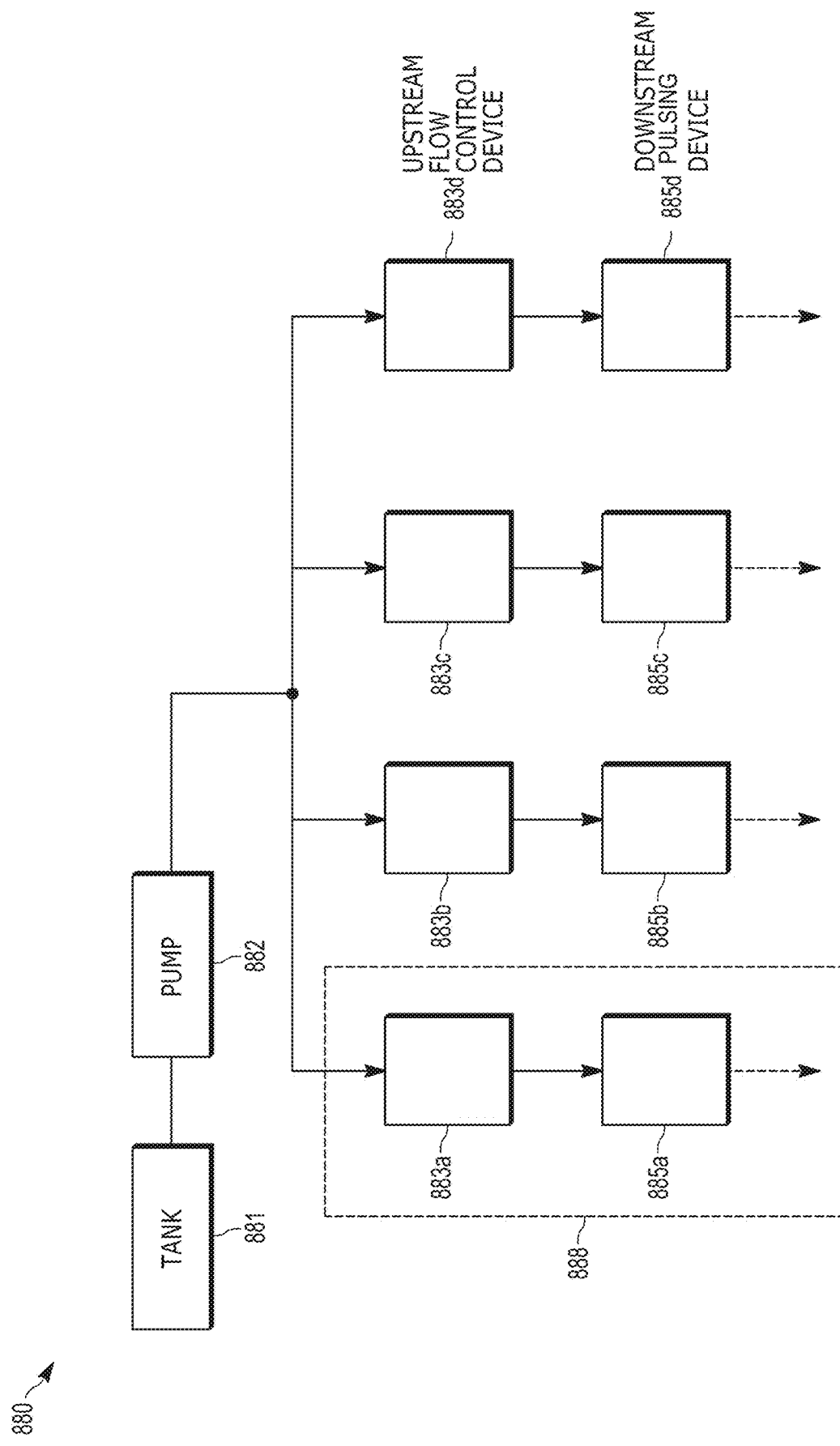
FIG. 8C illustrates an architecture of an implement 880 for controlling and monitoring applications (e.g., pulsed liquid applications, pulsed fluid mixture applications) in one embodiment.

FIG. 8C illustrates an architecture of an implement 880 for controlling and monitoring applications (e.g., pulsed liquid applications, pulsed fluid mixture applications) in one embodiment. The implement 880 includes at least one storage tank 881, flow lines, upstream flow control devices 883a-883d (e.g., CMUs), and at least one variable-rate pump 882 (e.g., electric, centrifugal, piston, etc.) for pumping and controlling application rate of a liquid (e.g., pulsed liquid application, pulsed semiliquid mixture) from the at least one storage tank to different downstream pulsing devices 885a-885d (e.g., PWM valves, rotary dispensing system, voice coil actuated valve). The devices 883a-d control flow by varying fluid restriction to control outlet pressure. The devices 883a-d may include a variable orifice flow control or a pump speed (pressure or flow) control system.

In one example, the devices 883a-883d are individual row upstream flow control devices and the device 883a is also on-row 888 with pulsing device 885a of a single row unit.

Figure 8D:
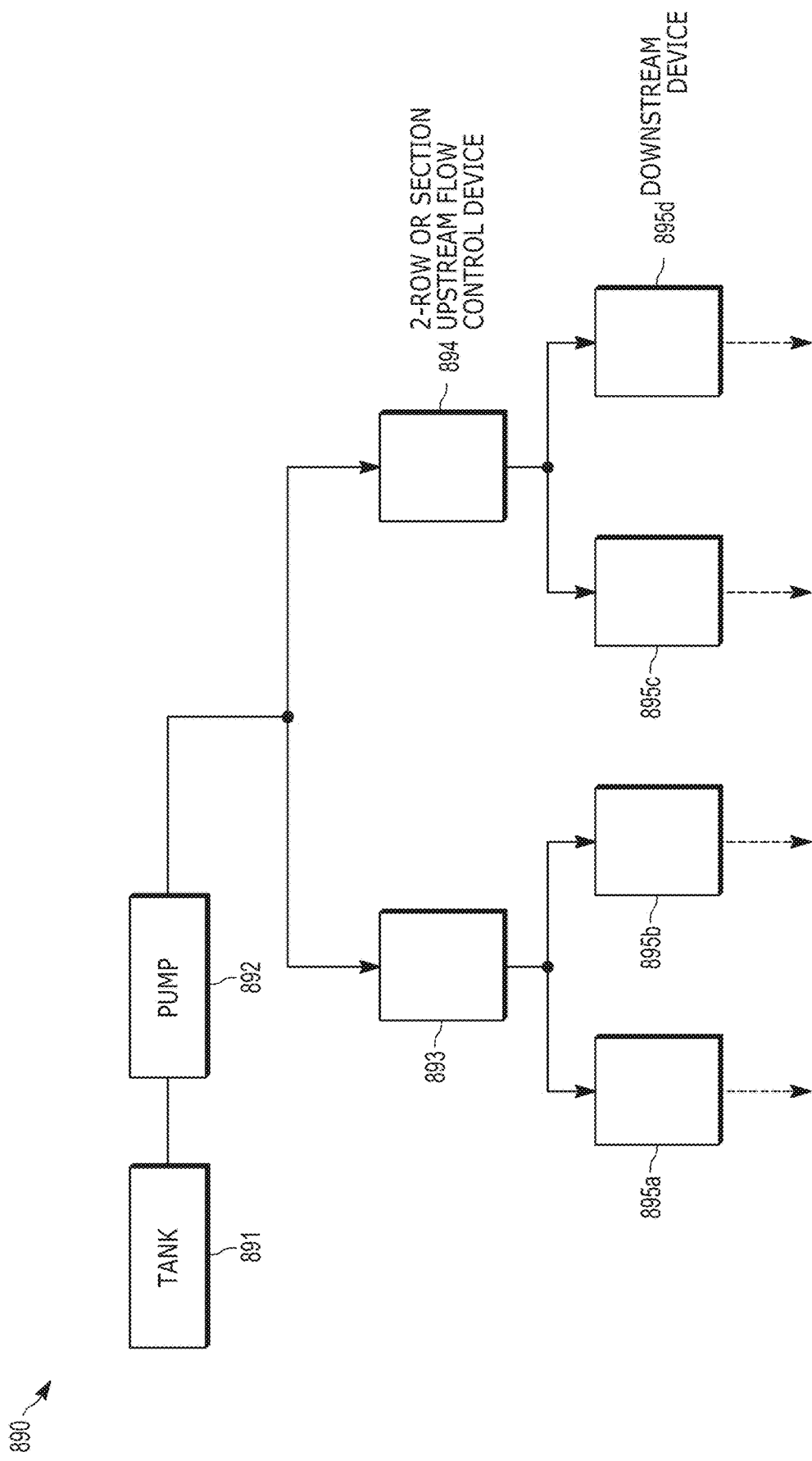
FIG. 8D illustrates an architecture of an implement 890 for controlling and monitoring applications (e.g., pulsed liquid applications, pulsed fluid mixture applications) in one embodiment.

FIG. 8D illustrates an architecture of an implement 890 for controlling and monitoring applications (e.g., pulsed liquid applications, pulsed fluid mixture applications) in one embodiment. The implement 890 includes at least one storage tank 891, flow lines, upstream flow control devices 893-894 (e.g., CMUs), and at least one variable-rate pump 892 (e.g., electric, centrifugal, piston, etc.) for pumping and controlling application rate of a liquid (e.g., pulsed liquid application, pulsed semiliquid mixture) from the at least one storage tank to different downstream pulsing devices 895a-895d (e.g., PWM valves, rotary dispensing system, voice coil actuated valve). The devices 893-894 control flow by varying fluid restriction to control outlet pressure. The devices 893-894 may include a variable orifice flow control or a pump speed (pressure or flow) control system.

In one example, the devices 893-894 control 2 row units or a section of row units with each row unit having at least one downstream pulsing device 895.

In another example, a variable-rate pump controls pumping of a liquid from a storage tank to a flow control device. In another example, the implement (e.g., 800, 870, 880, 890) includes multiple storage tanks. The pump controls pumping of a first liquid (e.g., first type of fertilizer) from a first storage tank to at least one flow control device and controls pumping of a second liquid (e.g., second type of fertilizer) from an additional second storage tank to at least one flow control device.

In another example, the implement includes multiple control pumps. Each control pump includes a section or group of row units. The control pump may have a flow rate range of 0.5 to 30 gallons per minute (gpm) while a CMU may have a flow rate range of 0.05 to 3 gpm.

Figure 9:
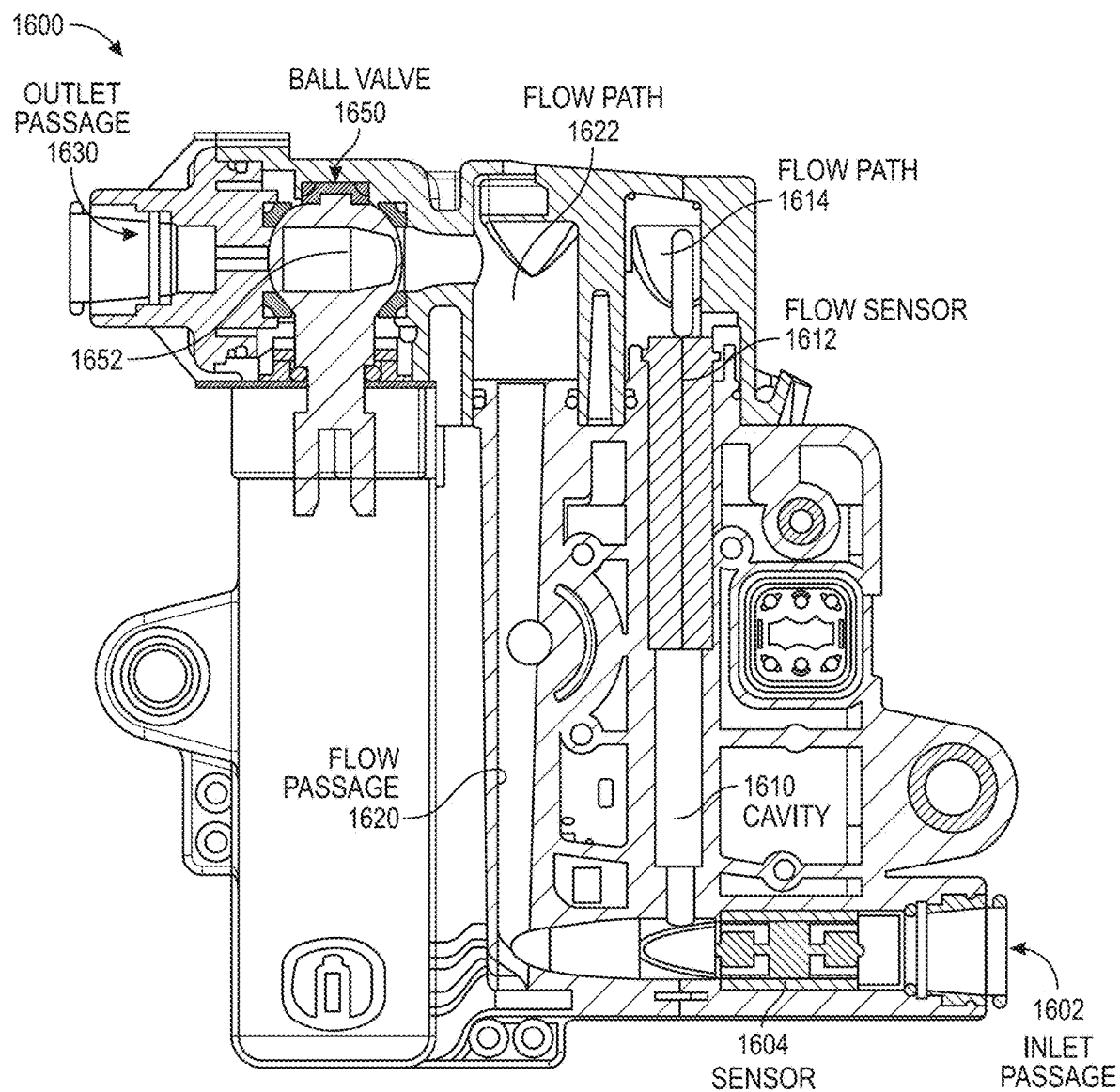
FIG. 9 illustrates an example of an upstream flow device to control flow in accordance with one embodiment.

In one example, a spray system comprises an upstream flow control device to control flow by varying fluid restriction to control outlet pressure including one of a variable orifice flow control and a pump speed control system. FIG. 9 illustrates an example of an upstream flow device to control flow in accordance with one embodiment. The flow device 1600 preferably includes an inlet passage 1602, a total flow sensor 1604 to measure a total flow through the inlet passage, a low flow cavity 1610 (preferably in fluid communication with a low pressure fluid source), a low flow sensor 1612 to measure a flow through the low flow cavity, a low flow path 1614, a high flow passage 1620 (preferably in fluid communication with a high pressure fluid source having a higher operating pressure than the low pressure fluid source), a high flow path 1622, and an outlet passage 1630 (preferably in fluid communication with an dispensing device such as a flexible tube for directing fluid to a desired location such as a planting trench). In one example, the high flow passage is capable of flow rates that are up to 60 times greater than flow rates of the low flow passage.

A ball valve 1650 (e.g., an offset ball valve) is preferably capable of receiving liquid flow from low and high flow paths and providing liquid flow to the outlet passage 1630. The ball valve 1650 preferably includes a ball valve opening 1652 (e.g., multiple cylindrical through-openings as illustrated). The ball valve 1650 is preferably retained in its translational position (but permitted to rotate as described herein) by seals. The ball valve may be coupled to an actuator (e.g., the output shaft of an electric motor in data communication with the implement network for receiving actuator position commands). The actuator is preferably configured to rotate the ball valve through a rotational range of motion about an axis normal to a central axis of the ball valve opening 1652. The range of motion of the ball valve 1650 when rotated by the actuator preferably comprises up to a 360 degree range of clockwise and/or counter-clockwise motion on the view of FIG. 9.

The position of the ball valve opening 1652 preferably determines a flow of liquid from high and low flow paths through the ball valve opening to the outlet passage 1630. The openings of the flow paths are preferably shaped such that the opened fractional portion of each opening increases or decreases (e.g., arithmetically, geometrically, exponentially, logarithmically) as a ball valve opening 1652 turns past each opening of the flow paths.

In one example, the ball valve 1650 continuously rotates to pulse flow for any downstream device (e.g., any fluid applicator, any fluid application unit, etc.).

In one embodiment, a spray system for dispensing fluid includes an upstream device (e.g., flow device 1600, CMU, devices 873, 883a-d, 893-894) for controlling flow of a material or fluid for an individual row (mounted on frame, but not on-row), On-row, 2-Row, or Section of row units. The upstream device controls flow by varying fluid restriction to control outlet pressure. The upstream device may include a variable orifice flow control or a pump speed (thus variable pressure or flow) control system.

In one example, the spray system includes a downstream On-row device, 2-Row device on-off PWM valve, or rotary dispensing system to pulse a fluid stream.

In another embodiment, a spray system includes a nozzle on a turret driven by an actuator (e.g., motor, etc.) for propelling the fluid to a desired target. The turret can be positioned on any of the fluid applicators and fluid apparatuses described herein. For example, the center and wing nozzles of the fluid application apparatus can be replaced with a turret that has an adjustable directional range of 180 degrees. In another example, a turret can be positioned on a distal end of a fluid applicator.

In another embodiment, plants in a field can be sensed to determine their location in the field. Any of the sensors described herein can be used. Once the location is known, material (e.g., fluid, solid, fertilizer) can be applied onto the plant or any place adjacent to the plant.

In any of the embodiments above, the sensing of the seeds, plants, and identifying characteristics of plants does not need to be done for each seed/plant. Since seeds/plants are approximately evenly spaced through a field, seeds/plants can be sensed during a sampling period to determine spacing. Once spacing is known, timing can be used to apply the material to the selected area Timing takes into account the speed traveling through the field and the distance between seeds/plants to activate, deactivate, or divert flow of material to the selected area. After an initial sampling period, additional sampling periods can be conducted to update the timing. The application of material can be synchronized with the speed of travel and the distance between seeds/plants.

Placement of material is determined based on the type of material and the location that the material is needed. Some materials can be applied to seeds/plants without harming the seeds/plants, and some materials are harmful to seeds/plants. Some materials readily move through soil, while some materials do not move through soil. Some materials can be placed to be used at different stages during plant growth. As a plant grows and the roots spread, materials can be available at selected times during plant growth.

Figure 10A:
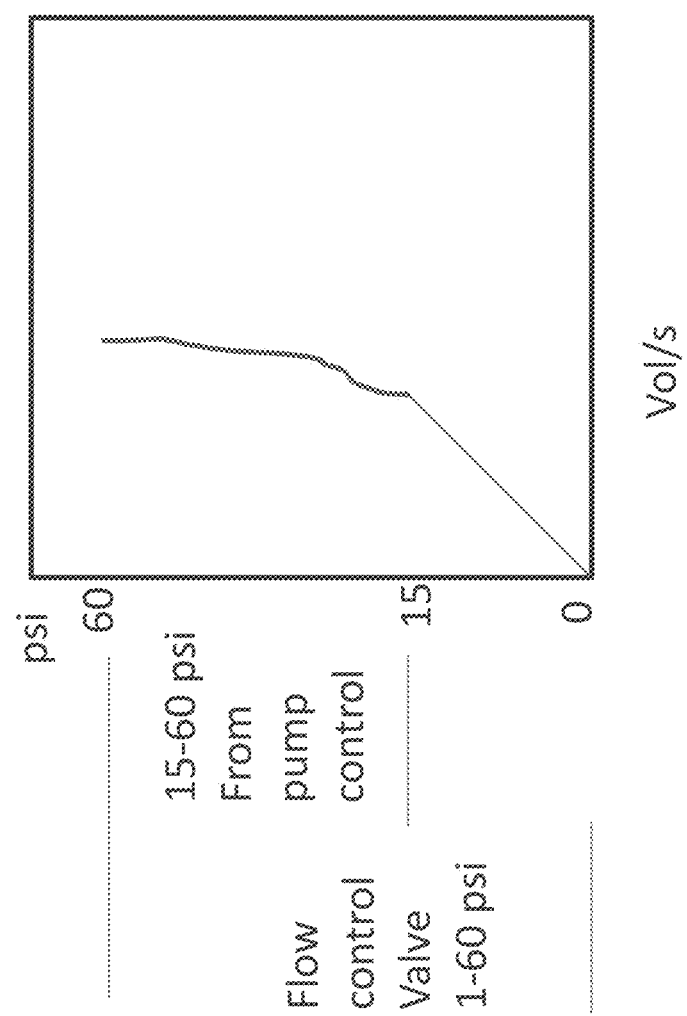
Figure 10B:
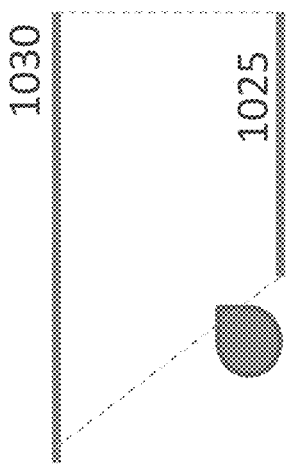

A control device 1010 (e.g., 1600, flow control valve) at each row unit upstream of a pulsing valve 1020 as illustrated in FIG. 10C for applying fluid can operate in a lower psi range (e.g., less than 15 psi) to obtain a laminar flow. Thus, resulting in better control of the fluid pulse applied to a desired target (e.g., furrow). However, currently pump pressure is controlled to regulate pressure to pulsing valves for a 15-60 psi range. The change in pressure for this range does not cause a change in volume/second due to a steep slope as illustrated in FIG. 10A for pump control. A flow control valve allows better control over a wider psi range (e.g., 0-100 psi (0-6.9×10^5 Pa) or 0-60 psi (0-4.2×10^5 Pa)). FIG. 10B illustrates an output fluid pulse 1030 being forced into a smaller pulse 1025 for pump control.

In one embodiment, a spray or dribble system for spraying a fluid (or dry material) onto soil in the rhizosphere of the plant includes applying the material to the soil within the rhizosphere of the plant (e.g., 0"-8" to the side of the plant or between the plants). The rhizosphere is a narrow region of soil that is directly influenced by root secretions and associated soil microorganisms. At least one sensor (e.g., optical, camera, sonar, radar, proximity (capacitive, EM) detects a plant or plant frequency. A control system uses the sensed plant pulses to command the spray system to dispense fluid or material (e.g., fertilizer) through either synchronizing with the plant pulses (e.g., pulsed fluid or material has frequency set equal to frequency of sensed plant pulses) or direct pulse based on detection of a plant pulse. The spraying can be a pulsing mechanism (e.g., on state, off state) or could also be a 'nozzle turret'.

In one embodiment, a spray or dribble system applies fluid pulses onto the leaves of plants. A sensor (e.g., optical, camera, sonar, radar, proximity (capacitive, EM)) detects plants, plant frequency, and characteristics of plants. A control system uses the sensed plant pulses to command the spray system to dispense fluid (e.g., fertilizer) through either synchronizing with the plant pulses or direct pulse based on detection of a plant pulse. The spraying can be a pulsing mechanism (e.g., on state, off state) or could also be a 'nozzle turret'.

In one example, a spray or dribble system includes a two arm fluid application device. In another example, the spray or dribble system includes a single arm fluid application device. In another example, a two arm fluid application device includes a first arm applicator having a pulsing mechanism and a second arm applicator with a continuous spray or dribble mechanism. In another example, a two arm fluid application device includes each arm applicator having at least one of a pulsing mechanism, a continuous spray, and dribble mechanism.

In one embodiment, a spray system for spraying a fluid onto the leaves of the plant includes a sensor (e.g., optical, camera, sonar, radar, proximity (capacitive, EM)) which detects and/or identifies the presence of a plant. A first spray nozzle sprays a first area with a first fluid. A control system uses the sensed plant pulses to command the spray system to dispense fluid based on detection and/or identification of input from the sensor. A second spray nozzle continuously spray a second area with a second fluid.

Figure 11A:
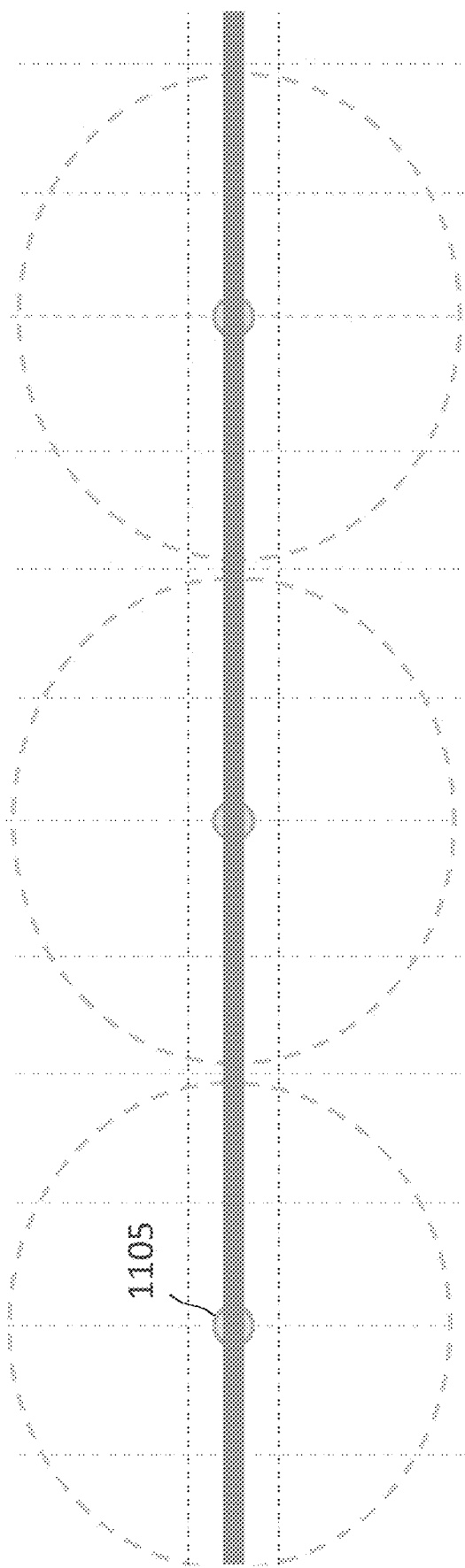
Figure 11B:
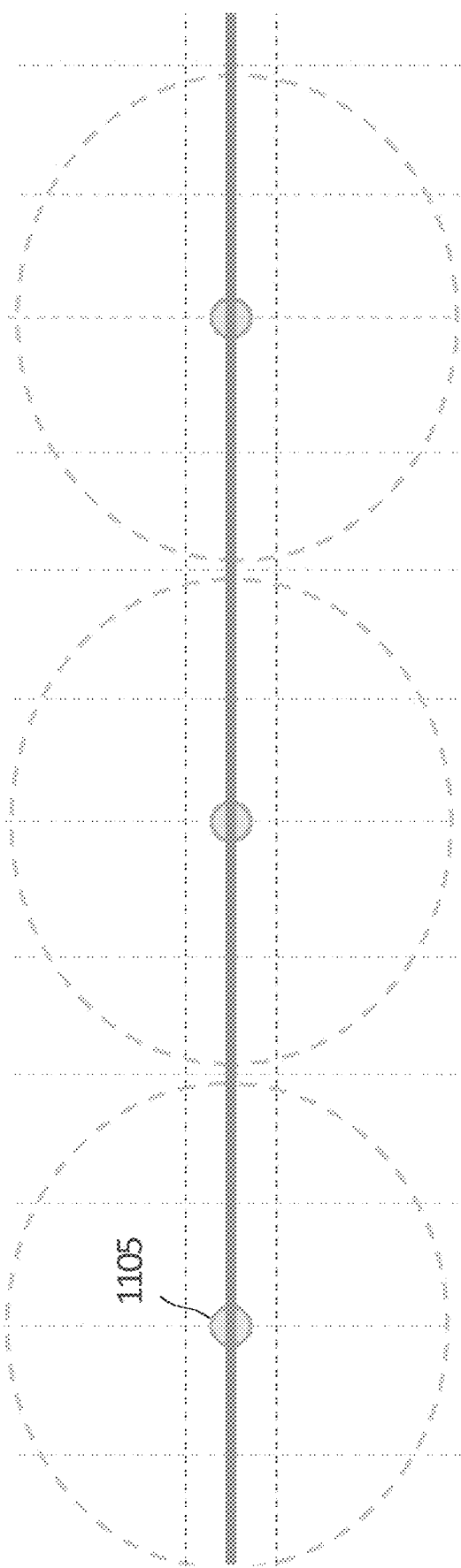

FIGS. 11A-G illustrate different microswath options for applying material to seed in a furrow in accordance with one embodiment. FIG. 11A illustrates a first option having a 10 gallons per acre (GPA) dribble that is applied as a continuous dribble on the seed 1105. In this example, the applicator has a tank rate of 10 GPA, a concentrate of 10 GPA, and the dribble applies approximately 100% coverage. FIG. 11B illustrates a second option having a 5 gallons per acre (GPA) dribble that is applied as a continuous dribble on the seed 1105. In this example, the applicator has a tank rate of 5 GPA, a concentrate of 5 GPA, and the dribble applies approximately 100% coverage. FIG. 11C illustrates a third option having a 5 gallons per acre (GPA) pulse that is applied as a pulse (e.g., rectangular region) near the seed 1105. In this example, the pulse has a length (e.g., 2-3", approximately 2.5") and is spaced a certain distance (e.g., 0.5-1", approximately 0.75") or offset to the seed (e.g., to the right of the seed). In this example, the applicator has a tank rate of 5 GPA, a concentrate of 20 GPA, and the pulse applies approximately 25% coverage in comparison to a continuous dribble of FIGS. 11A and 11B that have 100% coverage.

Figure 11D:
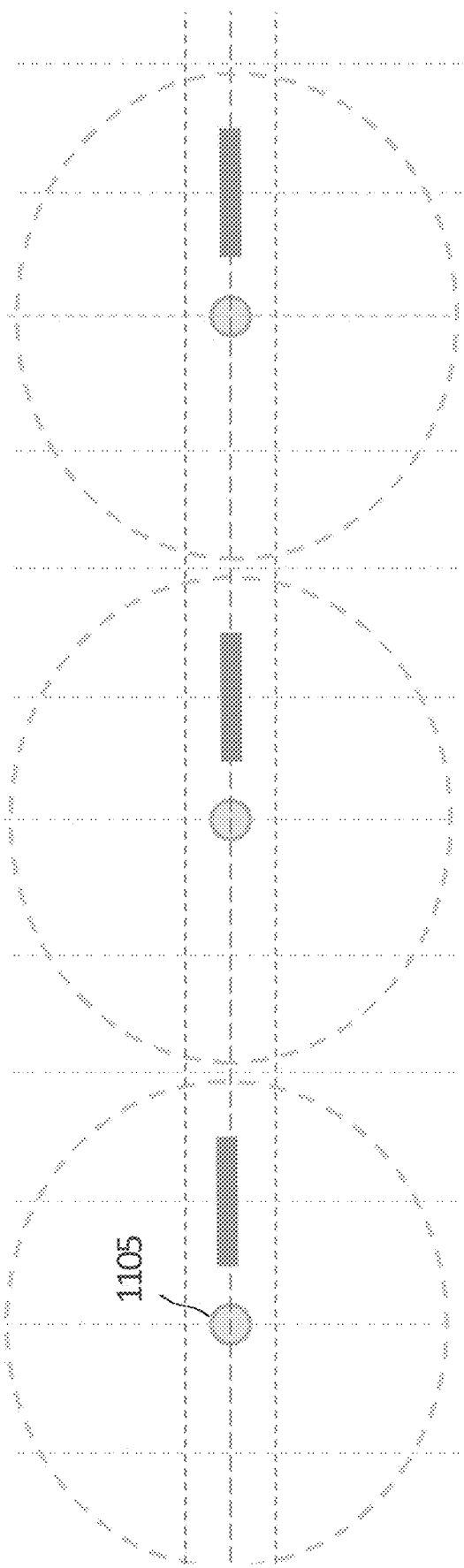

FIG. 11D illustrates a fourth option having a 2.5 gallons per acre (GPA) pulse that is applied as a pulse (e.g., rectangular region) near the seed 1105. In this example, the pulse has a length (e.g., 2-3", approximately 2.5") and is spaced a certain distance (e.g., 0.5-1", approximately 0.75") or offset to the seed (e.g., to the right of the seed). In this example, the applicator has a tank rate of 2.5 GPA, a concentrate of 10 GPA, and the pulse applies approximately 25% coverage in comparison to a continuous dribble of FIGS. 11A and 11B that have 100% coverage.

Figure 11E:
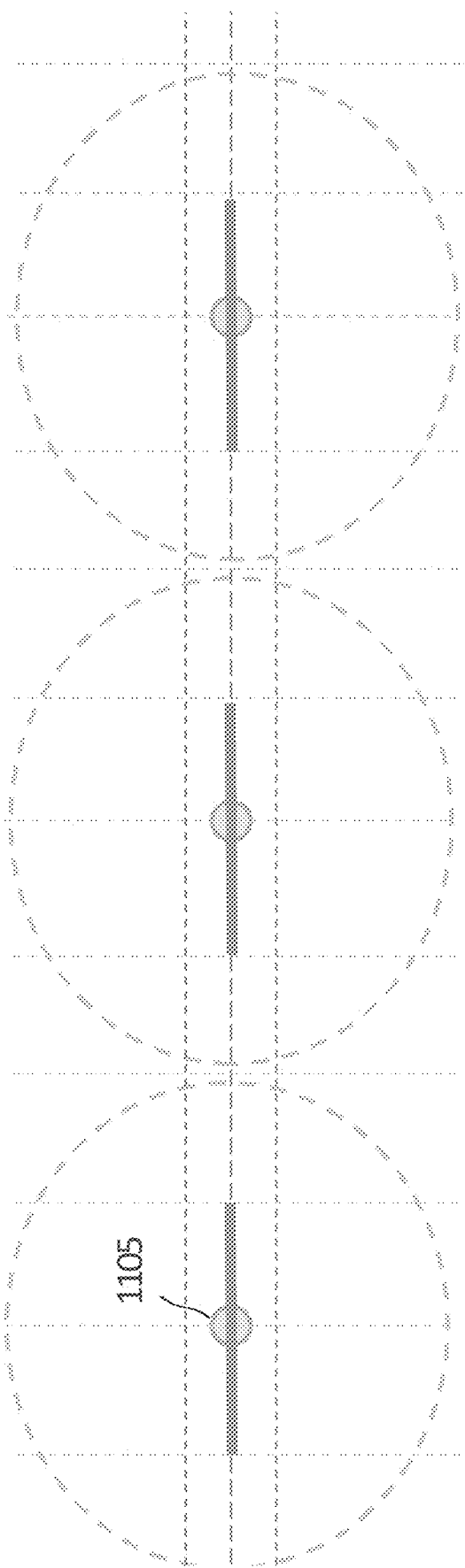

FIG. 11E illustrates a fifth option having a 2.5 gallons per acre (GPA) pulse that is applied as a pulse (e.g., rectangular region) on the seed 1105 and near the seed 1105. In this example, the pulse has a length (e.g., 2-3", approximately 2.5"). In this example, the applicator has a tank rate of 2.5 GPA, a concentrate of 5 GPA, and the pulse applies approximately 50% coverage in comparison to a continuous dribble of FIGS. 11A and 11B that have 100% coverage. This application for insecticide and low salt results in a cost savings for higher cost products due to 50% coverage and the same yield in comparison to a standard application.

Figure 11F:
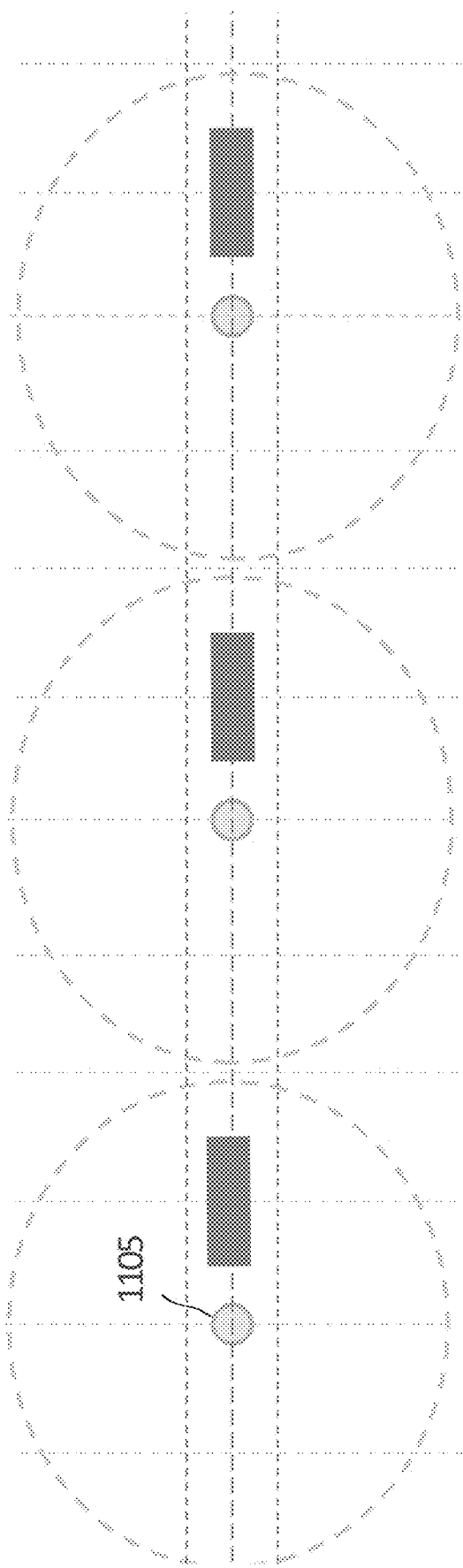

FIG. 11F illustrates a sixth option having a 5 gallons per acre (GPA) pulse that is applied as a pulse (e.g., rectangular region) is close proximity to the seed 1105. In this example, the pulse has a length (e.g., 2-3", approximately 2.5") and is spaced a certain distance (e.g., 0.5-1", approximately 0.75") or offset to the seed (e.g., to the right of the seed. In this example, the applicator has a tank rate of 5 GPA, a concentrate of 20 GPA, and the pulse applies approximately 25% coverage in comparison to a continuous dribble of FIGS. 11A and 11B that have 100% coverage. This application for non-low salt results in a cost savings by switching from higher cost products to lower cost products (e.g., non-low salt) and the same yield in comparison to a standard low salt application.

Figure 11G:
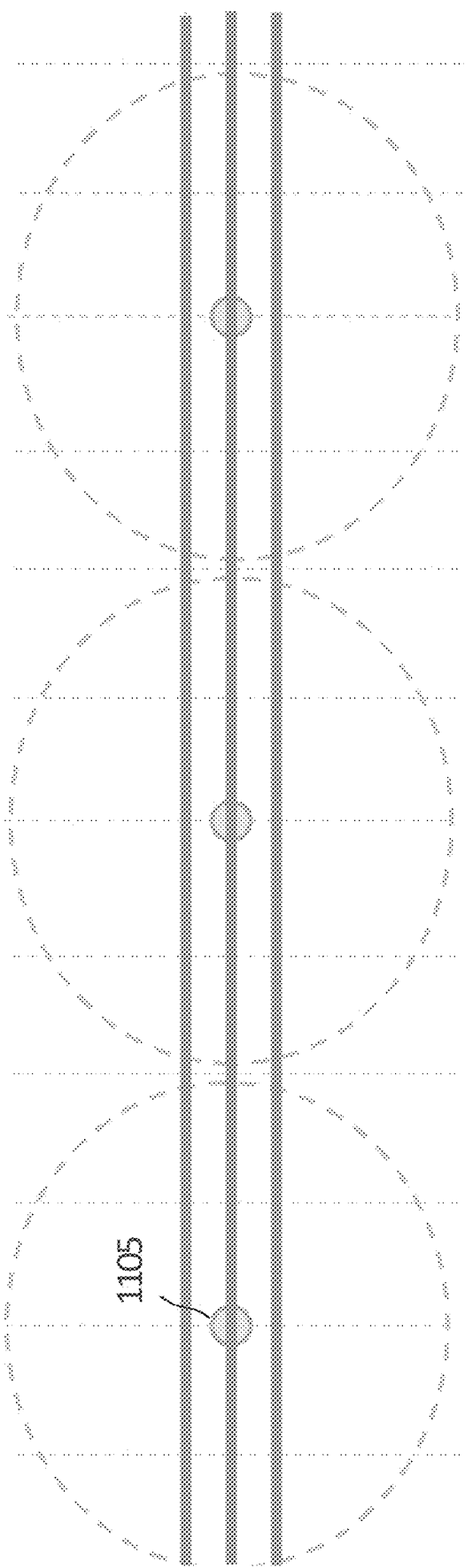

FIG. 11G illustrates a seventh option having a 15 gallons per acre (GPA) tri-band that is applied in a continuous manner on the seed 1105 for the center band and near the seed (e.g., 0.5-1" pitch between bands) for the side bands. In this example, the applicator has a tank rate of 15 GPA, a concentrate of 5 GPA, and the pulse applies approximately 100% coverage for 3 bands in comparison to a continuous dribble of FIGS. 11A and 11B that have 100% coverage. This application improves yield in comparison to a standard application.

Figure 11H:
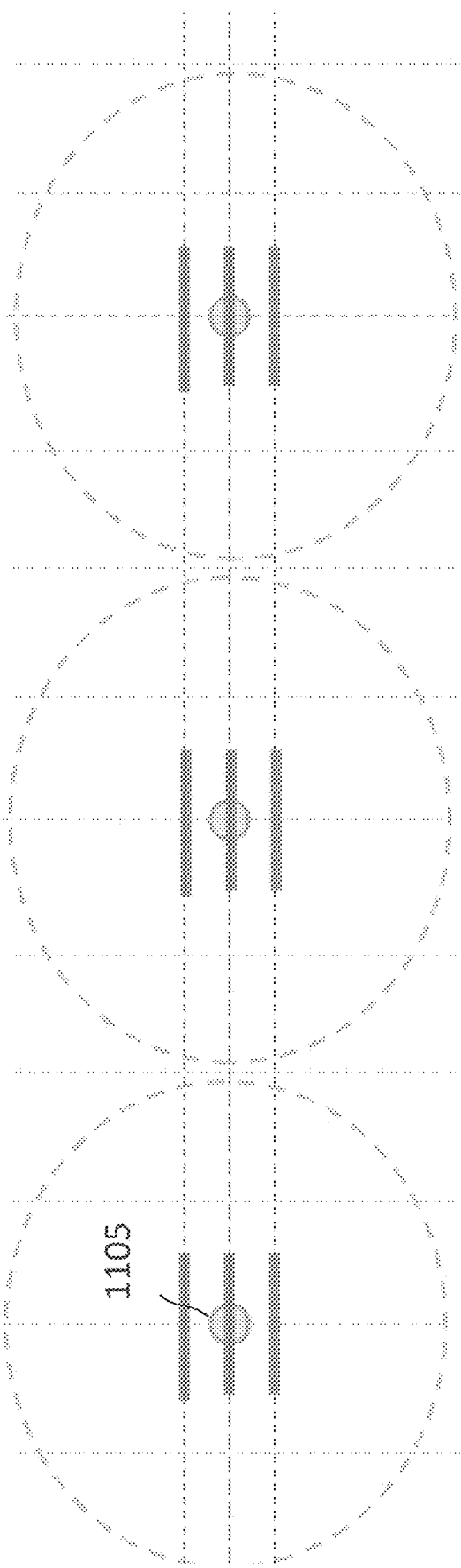

FIG. 11H illustrates an eighth option having a 5 gallons per acre (GPA) tri-band pulse that is applied as pulse with a length (e.g., 2-3") on the seed 1105 for the center band and near the seed (e.g., 0.5-1" pitch between bands) for the side bands. In this example, the applicator has a tank rate of 5 GPA, a concentrate of 5 GPA, and the pulse applies approximately 33% coverage for 3 bands in comparison to the continuous bands of FIG. 11G that has 100% coverage. This application removes logistical hurdles of higher rates, significantly reduces cost and shifts a return on investment curve due to less cost in comparison to the continuous tri-band application of FIG. 11G.

Figure 11I:
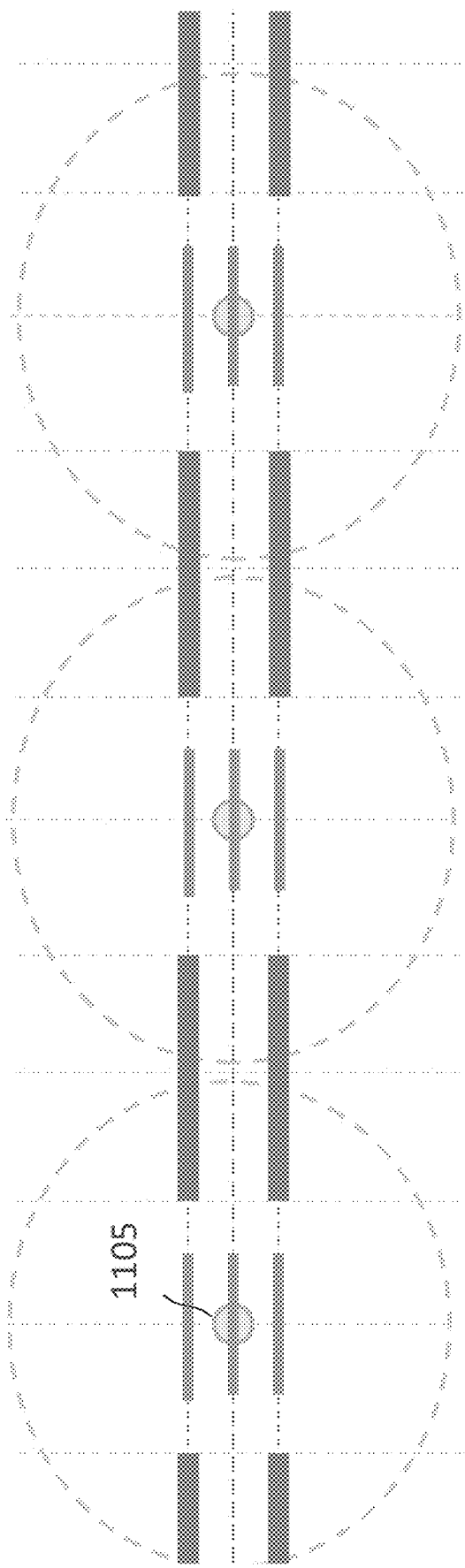

FIG. 11I illustrates a ninth option having a 10 gallons per acre (GPA) dual-band pulse that is applied as a pulse with a length (e.g., 2-4") between seed 1105 and also a 5 GPA tri-band pulse that is applied as a pulse with a length (e.g., 2-4") for the center band and near the seed (e.g., 0.5-1" pitch between bands) for the side bands. In this example, the applicator has a tank rate of 10 GPA, a concentrate of 10 GPA, and the pulse applies approximately 50% coverage for dual-bands and also has a tank rate of 5 GPA, a concentrate of 5 GPA, and the pulse applies approximately 33% coverage for 3 bands in comparison to the continuous bands of FIG. 11G that has 100% coverage. The dual-band application and tri-band application provide flexibility in applying multiple material or fluid applications at the same time for a given row.

Figure 12:
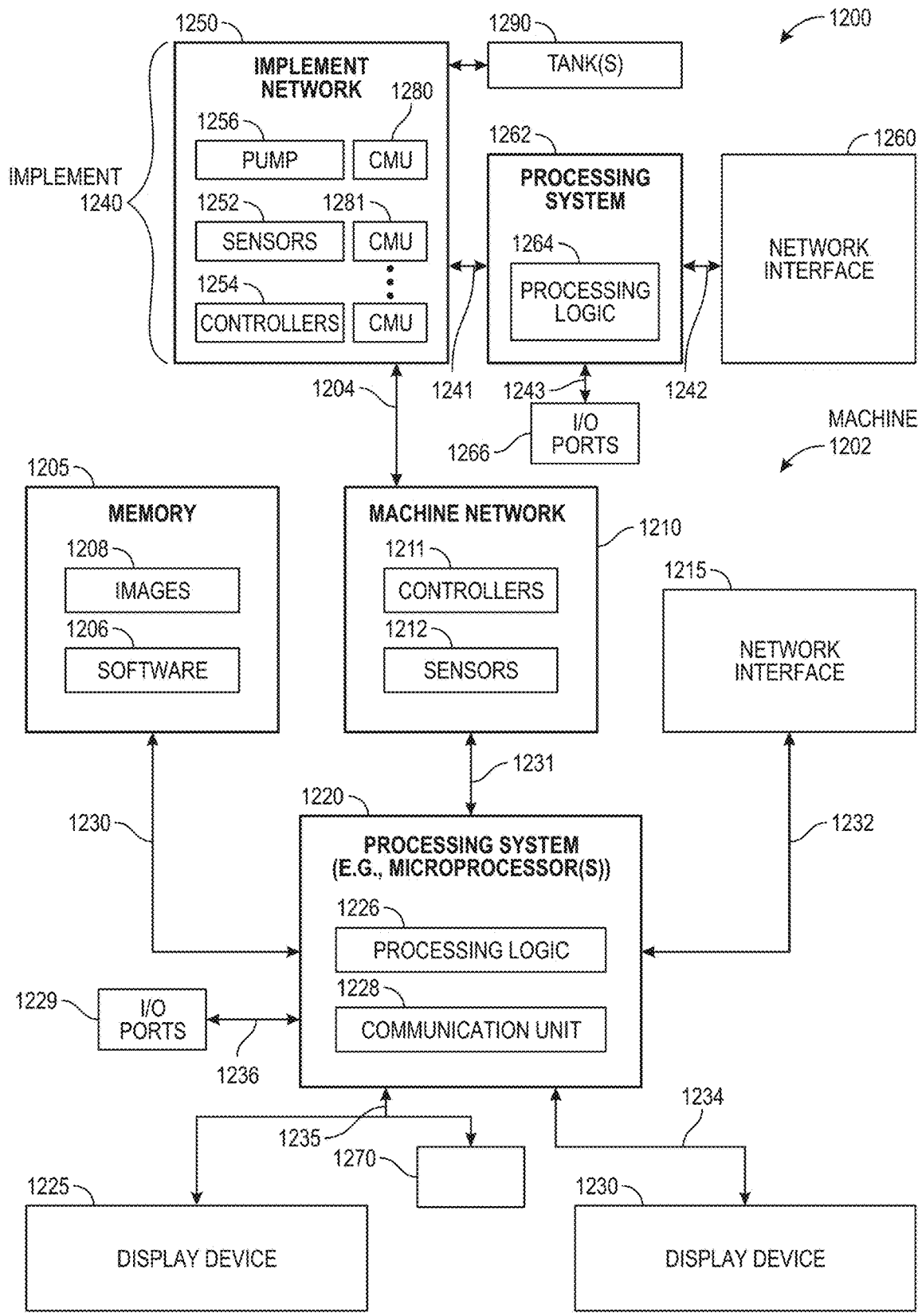
FIG. 12 shows an example of a system 1200 that includes a machine 1202 (e.g., tractor, combine harvester, etc.) and an implement 1240 (e.g., planter, sidedress bar, cultivator, plough, sprayer, spreader, irrigation implement, etc.) in accordance with one embodiment.

FIG. 12 shows an example of a system 1200 that includes a machine 1202 (e.g., tractor, combine harvester, etc.) and an implement 1240 (e.g., planter, sidedress bar, cultivator, plough, sprayer, spreader, irrigation implement, etc.) in accordance with one embodiment. The machine 1202 includes a processing system 1220, memory 1205, machine network 1210 (e.g., a controller area network (CAN) serial bus protocol network, an ISOBUS network, etc.), and a network interface 1215 for communicating with other systems or devices including the implement 1240. The machine network 1210 includes sensors 1212 (e.g., speed sensors), controllers 1211 (e.g., GPS receiver, radar unit) for controlling and monitoring operations of the machine or implement. The network interface 1215 can include at least one of a GPS transceiver, a WLAN transceiver (e.g., WiFi), an infrared transceiver, a Bluetooth transceiver, Ethernet, or other interfaces from communications with other devices and systems including the implement 1240. The network interface 1215 may be integrated with the machine network 1210 or separate from the machine network 1210 as illustrated in FIG. 12. The I/O ports 1229 (e.g., diagnostic/on board diagnostic (OBD) port) enable communication with another data processing system or device (e.g., display devices, sensors, etc.).

In one example, the machine performs operations of a tractor that is coupled to an implement for fluid applications (e.g., pulsed fluid applications) of a field. The flow rate of a fluid application for each row unit of the implement can be associated with locational data at time of application to have a better understanding of the applied fluid for each row and region of a field. Data associated with the fluid applications can be displayed on at least one of the display devices 1225 and 1230.

The processing system 1220 may include one or more microprocessors, processors, a system on a chip (integrated circuit), or one or more microcontrollers. The processing system includes processing logic 1226 for executing software instructions of one or more programs and a communication unit 1228 (e.g., transmitter, transceiver) for transmitting and receiving communications from the machine via machine network 1210 or network interface 1215 or implement via implement network 1250 or network interface 1260. The communication unit 1228 may be integrated with the processing system or separate from the processing system. In one embodiment, the communication unit 1228 is in data communication with the machine network 1210 and implement network 1250 via a diagnostic/OBD port of the I/O ports 1229.

Processing logic 1226 including one or more processors may process the communications received from the communication unit 1228 including agricultural data (e.g., GPS data, fluid application data, flow rates, sensed seed data, sensed plant data, etc.). The system 1200 includes memory 1205 for storing data and programs for execution (software 1206) by the processing system. The memory 1205 can store, for example, software components such as fluid application software for analysis of fluid applications for performing operations of the present disclosure, or any other software application or module, images (e.g., captured images of crops), alerts, maps, etc. The memory 1205 can be any known form of a machine readable non-transitory storage medium, such as semiconductor memory (e.g., flash; SRAM; DRAM; etc.) or non-volatile memory, such as hard disks or solid-state drive. The system can also include an audio input/output subsystem (not shown) which may include a microphone and a speaker for, for example, receiving and sending voice commands or for user authentication or authorization (e.g., biometrics).

The processing system 1220 communicates bi-directionally with memory 1205, machine network 1210, network interface 1215, header 1280, display device 1230, display device 1225, and I/O ports 1229 via communication links 1231-1236, respectively.

Display devices 1225 and 1230 can provide visual user interfaces for a user or operator. The display devices may include display controllers. In one embodiment, the display device 1225 is a portable tablet device or computing device with a touchscreen that displays data (e.g., fluid application data, captured images, localized view map layer, high definition field maps of as-applied fluid application data, as-planted or as-harvested data or other agricultural variables or parameters, yield maps, alerts, etc.) and data generated by an agricultural data analysis software application and receives input from the user or operator for an exploded view of a region of a field, monitoring and controlling field operations. The operations may include configuration of the machine or implement, reporting of data, control of the machine or implement including sensors and controllers, and storage of the data generated. The display device 1230 may be a display (e.g., display provided by an original equipment manufacturer (OEM)) that displays images and data for a localized view map layer, as-applied fluid application data, as-planted or as-harvested data, yield data, controlling a machine (e.g., planter, tractor, combine, sprayer, etc.), steering the machine, and monitoring the machine or an implement (e.g., planter, combine, sprayer, etc.) that is connected to the machine with sensors and controllers located on the machine or implement.

A cab control module 1270 may include an additional control module for enabling or disabling certain components or devices of the machine or implement. For example, if the user or operator is not able to control the machine or implement using one or more of the display devices, then the cab control module may include switches to shut down or turn off components or devices of the machine or implement.

The implement 1240 (e.g., planter, cultivator, plough, sprayer, spreader, irrigation implement, etc.) includes an implement network 1250, a processing system 1262, a network interface 1260, and optional input/output ports 1266 for communicating with other systems or devices including the machine 1202. The implement network 1250 (e.g., a controller area network (CAN) serial bus protocol network, an ISOBUS network, etc.) includes a pump 1256 for pumping fluid from a storage tank(s) 1290 to application units 1280, 1281, . . . N of the implement, sensors 1252 (e.g., speed sensors, seed sensors for detecting passage of seed in a seed tube, exiting a seed tube, after a seed tube prior to a furrow, or into the furrow, plant sensors for sensing plants and characteristics of the plants, downforce sensors, actuator valves, moisture sensors or flow sensors for a combine, speed sensors for the machine, seed force sensors for a planter, fluid application sensors for a sprayer, or vacuum, lift, lower sensors for an implement, flow sensors, etc.), controllers 1254 (e.g., GPS receiver, a control system for controlling the material application system based on the seed placement, control system uses the sensed seed pulses to command the spray system to dispense the material, control system for any embodiments described herein), and the processing system 1262 for controlling and monitoring operations of the implement. The pump controls and monitors the application of the fluid to crops or soil as applied by the implement. The fluid application can be applied at any stage of crop development including within a planting trench upon planting of seeds, adjacent to a planting trench in a separate trench, or in a region that is nearby to the planting region (e.g., between rows of corn or soybeans) having seeds or crop growth.

For example, the controllers may include processors in communication with a plurality of seed sensors and plant sensors. The processors are configured to process data (e.g., fluid application data, seed sensor data, plant sensor data) and transmit processed data to the processing system 1262 or 1220. The controllers and sensors may be used for monitoring motors and drives on a planter including a variable rate drive system for changing plant populations. The controllers and sensors may also provide swath control to shut off individual rows or sections of the planter. The sensors and controllers may sense changes in an electric motor that controls each row of a planter individually. These sensors and controllers may sense seed delivery speeds in a seed tube for each row of a planter.

The network interface 1260 can be a GPS transceiver, a WLAN transceiver (e.g., WiFi), an infrared transceiver, a Bluetooth transceiver, Ethernet, or other interfaces from communications with other devices and systems including the machine 1202. The network interface 1260 may be integrated with the implement network 1250 or separate from the implement network 1250 as illustrated in FIG. 12.

The processing system 1262 communicates bi-directionally with the implement network 1250, network interface 1260, and I/O ports 1266 via communication links 1241-1243, respectively.

The implement communicates with the machine via wired and possibly also wireless bi-directional communications 1204. The implement network 1250 may communicate directly with the machine network 1210 or via the networks interfaces 1215 and 1260. The implement may also by physically coupled to the machine for agricultural operations (e.g., planting, harvesting, spraying, etc.).

The memory 1205 may be a machine-accessible non-transitory medium on which is stored one or more sets of instructions (e.g., software 1206) embodying any one or more of the methodologies or functions described herein. The software 1206 may also reside, completely or at least partially, within the memory 1205 and/or within the processing system 1220 during execution thereof by the system 1200, the memory and the processing system also constituting machine-accessible storage media. The software 1206 may further be transmitted or received over a network via the network interface 1215.

In one embodiment, a machine-accessible non-transitory medium (e.g., memory 1205) contains executable computer program instructions which when executed by a data processing system cause the system to perform operations or methods of the present disclosure. While the machine-accessible non-transitory medium (e.g., memory 1205) is shown in an exemplary embodiment to be a single medium, the term "machine-accessible non-transitory medium" should be taken to include a single medium or multiple media (e.g., a centralized or distributed database, and/or associated caches and servers) that store the one or more sets of instructions. The term "machine-accessible non-transitory medium" shall also be taken to include any medium that is capable of storing, encoding or carrying a set of instructions for execution by the machine and that cause the machine to perform any one or more of the methodologies of the present disclosure. The term "machine-accessible non-transitory medium" shall accordingly be taken to include, but not be limited to, solid-state memories, optical and magnetic media, and carrier wave signals.

Figure 13A:
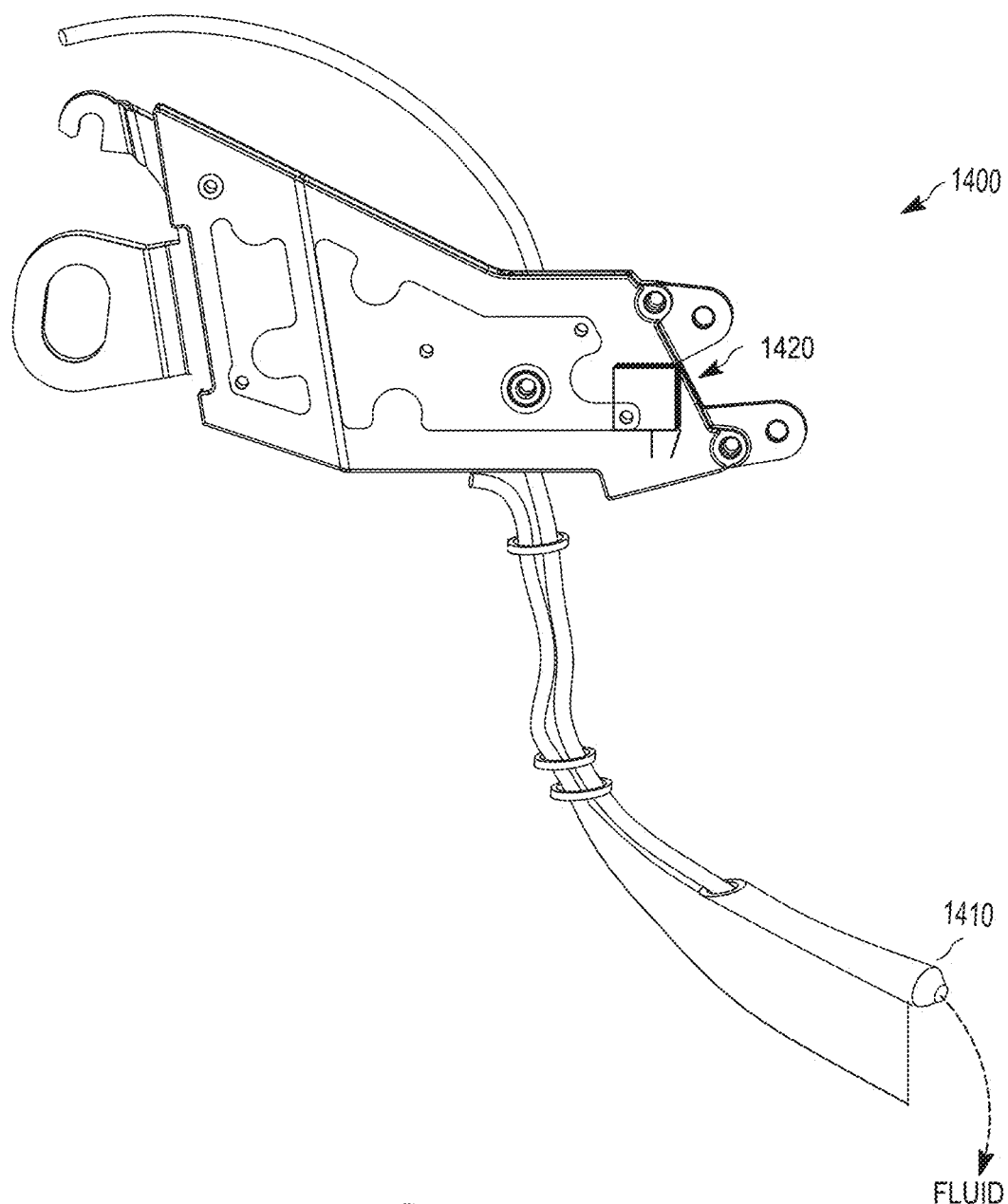
FIG. 13A illustrates a firmer 1400 having a fluid applicator 1410 for spraying a fluid application (e.g., fertilizer) towards a furrow in accordance with one embodiment.
Figure 13B:
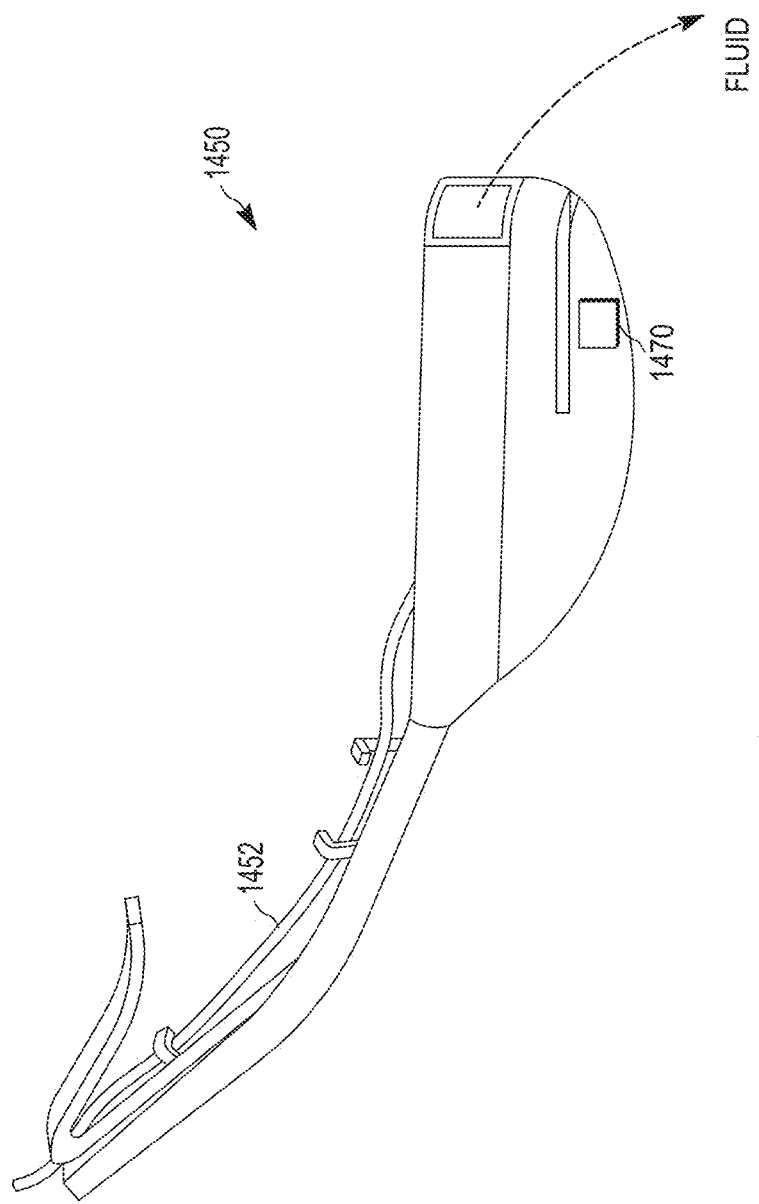
FIG. 13B illustrates a firmer having a fluid applicator 1452 for spraying a fluid application (e.g., fertilizer) towards a furrow in accordance with another embodiment.

In one embodiment, FIGS. 13A and 13B illustrate examples of resilient tools (e.g., seed firmers) having fluid lines and sensors for sensing seed data. FIG. 13A illustrates a firmer 1400 having a fluid applicator 1410 for spraying a fluid application (e.g., fertilizer) towards a furrow. The firmer may be embedded with sensors (e.g., sensor 1420) in any location for sensing seed data and plant data as described herein.

FIG. 13B illustrates a firmer having a fluid applicator 1452 for spraying a fluid application (e.g., fertilizer) towards a furrow. The firmer 1450 may be embedded with sensors in any location (e.g., sensor 1470) or sensors can be positioned on a bracket that attaches the firmer to a toolbar. The sensors can used for sensing seed data and plant data as described herein.

Any of the examples described herein can be combined into a single embodiment or these examples can be separate embodiments. In a first embodiment, a material application system for selected application of the material comprising: an implement for traversing a field; a sensor disposed on the implement, the sensor to detect seeds being dispensed from a seed meter when the seeds exit a seed tube or seed conveyor or after the seeds exit the seed tube or seed conveyor; and a material application system disposed on the implement and configured to apply material on the seed, adjacent to the seed, or to both on the seed and adjacent to the seed; and a control system for controlling the material application system based on the detected seeds.

In one example of the first embodiment, the control system controls material application based on implement speed during material application and seed spacing in a furrow. In another example, the sensor is mounted after the seed has exited the seed tube to sense the seed frequency. In another example, the material application system comprises a planter, and the sensor is mounted after the seed has exited the seed tube and mounted at one of the following locations including a bottom of the seed tube, a seed firmer bracket, within a disc spreader, within a seed firmer, a rear of a shank or between the shank and a closing system, and the closing system. In another example, the control system uses the sensed seed pulses to command the material application system to dispense the material either by synchronizing with the seed pulses or direct relationship between a sensed seed pulse and pulsed material application.

In another example of the first embodiment, the sensor is mounted at the bottom of the seed tube or seed conveyor. In another example, the sensor is mounted at a seed firmer bracket. In another example, the sensor is mounted within a disc spreader. In another example, the sensor is mounted within a seed firmer. In another example, the sensor is mounted rear of a shank or between the shank and a closing system. In another example, the sensor is mounted at the closing system. In another example, the material application system comprises a flow control valve and a pulsing valve, wherein the flow control valve regulates pressure and flow of fluid to the pulsing valve.

In a second embodiment, a planter system comprised of planting seeds and applying a material comprising: a seeding meter for dispensing seed through a seed tube or other device; a sensor to detect seed or seed frequency including sensed seed pulses; a material application system to apply the material in response to receiving a signal that is based on sensed seed pulses, the material application system to apply the material through at least one of wing nozzles or a turret with an adjustable directional range of a furrow device, center nozzles or a turret with an adjustable directional range of the furrow device, a fluid applicator having at least one sidewall injection conduit, a seed firmer, a seed firmer having at least one sensor, a knife disposed adjacent to a furrow, and a coulter disposed adjacent to a furrow; and a control system to use the sensed seed pulses to command the material application system to apply the material either by synchronizing with the seed pulses or a direct relationship between a sensed seed pulse and pulsed material application.

In another example of the second embodiment, the material application system applies the material through a fluid applicator having at least one sidewall injection conduit and at least one of wing nozzles and center nozzles of a furrow device. In another example, the material application system applies the material through a fluid applicator having at least one sidewall injection conduit and a seed firmer. In another example, the material application system applies the material through a fluid applicator having at least one sidewall injection conduit and a seed firmer having a sensor.

In a third embodiment, a planter system for planting seeds and applying a material comprising: a seeding meter for dispensing seed through a seed tube or other device; a sensor to detect seed or seed frequency including sensed seed pulses; a material application system to apply material in response to receiving a signal that is based on sensed seed pulses, the material application system dispenses the material with one or more dispensing devices containing at least first and second material dispensing locations; a flow diverting device to divert flow between first and second material dispensing locations to only dispense one location at a time; and a control system to use the sensed seed pulses to command the material application system to apply the material either by synchronizing with the seed pulses or a direct relationship between a sensed seed pulse and pulsed material application.

In another example of the third embodiment, the material application system comprises a downstream on-off pulse width modulated valve. In another example, the material application system comprises a voice coil actuated valve. In another example, the flow diverting device enables flow during a certain region of a field for a first material dispensing location and enables flow during a different region of a field for a second material dispensing location.

In a fourth embodiment, a planter system for planting seeds and applying a material comprising: a seeding meter for dispensing seed through a seed tube or other device; a sensor to detect seed or seed frequency including sensed seed pulses; a material application system to apply the material in response to receiving a signal that is based on sensed seed pulses; a continuously rotating dispensing system having an orifice that opens and closes in response to rotation of the dispensing system; a control system to use the sensed seed pulses to command the material application system to dispense material by synchronizing the rotational speed of rotating dispensing system with a seed pulse frequency of the sensed seed pulses.

In another example of the fourth embodiment, the material application system comprises an upstream device to control flow by varying fluid restriction to control outlet pressure including one of a variable orifice flow control and a pump speed control system. In another example, the upstream device and the dispensing system for each row unit of the planter system are disposed on the row unit. In another example, dispensing system includes a downstream On-row device, 2-Row device on-off PWM valve, or rotary dispensing system to pulse a fluid stream.

In a fifth embodiment, a fluid system comprising: at least one applicator for spraying or dribbling a fluid or material onto soil in a rhizosphere of plants or spraying or dribbling a fluid or material onto plants; at least one sensor to detect plant pulses for a plurality of plants in a row; and a control system uses the sensed plant pulses to command the fluid system to dispense fluid or material with a pulsed fluid or material having a frequency that is set equal to a frequency of the sensed plant pulses or a direct pulse of the fluid or material is based on detection of a plant pulse. In one example, the at least one applicator sprays or dribbles a fluid or material onto soil in a rhizosphere of plants. In another example, the at least one applicator sprays or dribbles a fluid or material onto the plants.

In another example of the fifth embodiment, the pulsed fluid or material is applied onto leaves of plants. In another example, the at least one applicator comprises a first arm applicator having a pulsing mechanism and a second arm applicator with a continuous spray or dribble mechanism. In another example, the at least one applicator comprises a first arm applicator with a first nozzle to spray a first area with a first fluid and a second arm applicator with a second nozzle to spray a second area with a continuous spray mechanism.

In a sixth embodiment, a fluid application system for selected application of the fluid comprising: an implement for traversing a field; a sensor disposed on the implement, the sensor to detect seeds being dispensed from a seed meter or to detect plants in the field; a material application system disposed on the implement and configured to apply material on, adjacent to, or to both on and adjacent to the seed or the plant, wherein the material application system comprises a flow control valve and a pulsing valve, wherein the flow control valve regulates pressure and flow of fluid to the pulsing valve; and a control system for controlling the material application system based on the detected seeds or plants. In another example of the sixth embodiment, the fluid control valve is configured to provide laminar flow to the pulsing valve over a pressure range of 0 to $6.9 \times 10^5$ Pa.

In another example, the fluid control valve comprises: an offset ball valve having multiple openings that rotate in position to control flow of a liquid through the offset ball valve to an outlet passage; a first passage to provide a first flow path from an inlet to at least one opening of the offset ball valve; and a second passage to provide a second flow path from the inlet to at least one opening of the offset ball valve.

In another example, the fluid control valve comprises: a valve having an opening for controlling flow of a liquid through the valve to an outlet; a first passage to provide a first flow path having a variable first flow rate from an inlet to the valve, the first passage includes a first flow meter to monitor flow of the liquid through the first passage; and a second passage to provide a second flow path having a variable second flow rate from the inlet to the valve, the second passage includes a second flow meter to monitor flow of the liquid through the second passage.

What is claimed is:

1. A planter system for planting seeds and applying a material comprising:
    a seeding meter for dispensing seed through a seed tube or other device;
    a sensor to detect seed or seed frequency including sensed seed pulses;
    a material application system to apply material in response to receiving a signal that is based on sensed seed pulses, the material application system dispenses the material with one or more dispensing devices containing at least a center applicator at a first material dispensing location to dispense material into a seed furrow, and a first sidewall applicator at a second material dispensing location to dispense material into a first sidewall of the seed furrow;
    a flow diverting device to divert flow between the first and second material dispensing locations to only dispense one material dispensing location at a time; and
    a control system to use the sensed seed pulses to command the material application system to apply the material either by synchronizing with the seed pulses or a direct relationship between a sensed seed pulse and pulsed material application.

2. The planter system of claim 1, wherein the material application system comprises a downstream on-off pulse width modulated valve.

3. The planter system of claim 1, wherein the material application system comprises a voice coil actuated valve.

4. The planter system of claim 1, wherein the flow diverting device enables flow during a certain region of a field for the first material dispensing location and enables flow during a different region of a field for the second material dispensing location.

5. The planter system of claim 1, wherein the one or more dispensing devices comprises the center applicator at the first material dispensing location, the first sidewall applicator at the second material dispensing location to dispense material into the first sidewall of the seed furrow, and a second sidewall applicator at a third material dispensing location to dispense material into a second sidewall of the seed furrow.

6. The planter system of claim 1, further comprising:
    at least one opening disc to open the seed furrow having a first depth; and
    a trench forming member to open a furrow having a second depth that is laterally offset to the seed furrow, wherein the one or more dispensing devices further comprises a fluid applicator at a fourth material dispensing location to dispense material into the furrow that is laterally offset to the seed furrow.

* * * * *